United States Patent
Ito et al.

(10) Patent No.: US 10,359,077 B2
(45) Date of Patent: Jul. 23, 2019

(54) ROLLING BEARING WITH ABNORMALITY DETECTOR

(71) Applicant: NTN CORPORATION, Osaka (JP)

(72) Inventors: Hiroyoshi Ito, Mie (JP); Naota Yamamoto, Mie (JP); Shota Toho, Mie (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 15/750,003

(22) PCT Filed: Jul. 29, 2016

(86) PCT No.: PCT/JP2016/072387
§ 371 (c)(1),
(2) Date: Feb. 2, 2018

(87) PCT Pub. No.: WO2017/022682
PCT Pub. Date: Feb. 9, 2017

(65) Prior Publication Data
US 2018/0223907 A1 Aug. 9, 2018

(30) Foreign Application Priority Data

Aug. 5, 2015 (JP) ................................. 2015-154883
Nov. 12, 2015 (JP) ................................. 2015-222177

(51) Int. Cl.
*F16C 41/00* (2006.01)
*F16C 33/66* (2006.01)
(Continued)

(52) U.S. Cl.
CPC .......... *F16C 33/667* (2013.01); *F16C 19/383* (2013.01); *F16C 19/52* (2013.01);
(Continued)

(58) Field of Classification Search
CPC .. F03G 1/02; F03G 1/08; A63H 29/04; B60B 33/00; B60B 33/045; B60B 33/39;
(Continued)

(56) References Cited

U.S. PATENT DOCUMENTS 2,757,988 A * 8/1956 Henri ..................... B65G 39/09
384/481
3,283,855 A * 11/1966 Kaplan ..................... F03G 1/02
185/39
(Continued)

FOREIGN PATENT DOCUMENTS

JP 01-316519 12/1989
JP 05-040698 6/1993
(Continued)

OTHER PUBLICATIONS

International Search Report on Patentability dated Feb. 6, 2018 in International (PCT) Application No. PCT/JP2016/072387.
(Continued)

*Primary Examiner* — Phillip A Johnson
(74) *Attorney, Agent, or Firm* — Wenderoth, Lind & Ponack, L.L.P.

(57) ABSTRACT

The present invention provides an abnormality detector for a rolling bearing including an outer race, and an inner race. The abnormality detector includes a filter configured to prevent metal pieces contained in lubricating oil flowing through the bearing space between the outer and inner races from passing through the filter, while allowing the lubricating oil to pass through the filter so as to flow to the outside space of the bearing space; an electric circuit including a pair of permanent magnets mounted, as a pair of electrodes, to the filter so as to be spaced apart from each other, and lines extending from the respective electrodes to a power source; and an output detector configured to detect a change in electrical output from the electric circuit when metal pieces (Continued)

adhere between the pair of permanent magnets, thereby detecting the state of metal pieces contained in the lubricating oil.

20 Claims, 9 Drawing Sheets

(51) Int. Cl.
| | |
|---|---|
| *F16N 29/04* | (2006.01) |
| *F16C 19/52* | (2006.01) |
| *F16C 19/38* | (2006.01) |
| *F16C 33/82* | (2006.01) |
| *F16C 19/36* | (2006.01) |
| *F16C 19/54* | (2006.01) |

(52) U.S. Cl.
CPC ............ *F16C 33/82* (2013.01); *F16C 41/005* (2013.01); *F16N 29/04* (2013.01); *F16C 19/364* (2013.01); *F16C 19/541* (2013.01); *F16C 2210/02* (2013.01); *F16C 2233/00* (2013.01); *F16N 2200/04* (2013.01); *F16N 2210/14* (2013.01); *F16N 2260/18* (2013.01)

(58) Field of Classification Search
CPC ....... B60B 33/49; B62B 5/0026; F16D 41/02; F16D 41/06; F16D 41/064; F16D 2041/0608; F16D 2041/0646
See application file for complete search history.

(56) References Cited

U.S. PATENT DOCUMENTS

| | | | | |
|---|---|---|---|---|
| 3,294,298 | A | * 12/1966 | Danielson | ................ A45F 5/00 |
| | | | | 224/666 |
| 4,946,296 | A | 8/1990 | Olschewski et al. | |
| 5,696,331 | A | 12/1997 | Otsuka et al. | |
| 6,546,785 | B1 | * 4/2003 | Discenzo | ................ F16C 19/52 |
| | | | | 137/805 |
| 2002/0145530 | A1 | 10/2002 | Sato | |
| 2003/0066713 | A1 | * 4/2003 | Nagao | ................... A63H 29/04 |
| | | | | 185/37 |
| 2016/0108962 | A1 | 4/2016 | Miyazaki et al. | |

FOREIGN PATENT DOCUMENTS

| | | | |
|---|---|---|---|
| JP | 06-011376 | 1/1994 | |
| JP | 07-280180 | 10/1995 | |
| JP | 11-230495 | 8/1999 | |
| JP | 2002-310967 | 10/2002 | |
| JP | 2004-293776 | 10/2004 | |
| JP | 2014-231856 | 12/2014 | |
| WO | WO-2012128316 A1 * | 9/2012 | ............ F16C 19/364 |
| WO | WO-2013191014 A1 * | 12/2013 | ............ F16J 15/324 |
| WO | 2015/152329 | 10/2015 | |

OTHER PUBLICATIONS

International Search Report dated Oct. 25, 2016 in International (PCT) Application No. PCT/JP2016/072387.

* cited by examiner

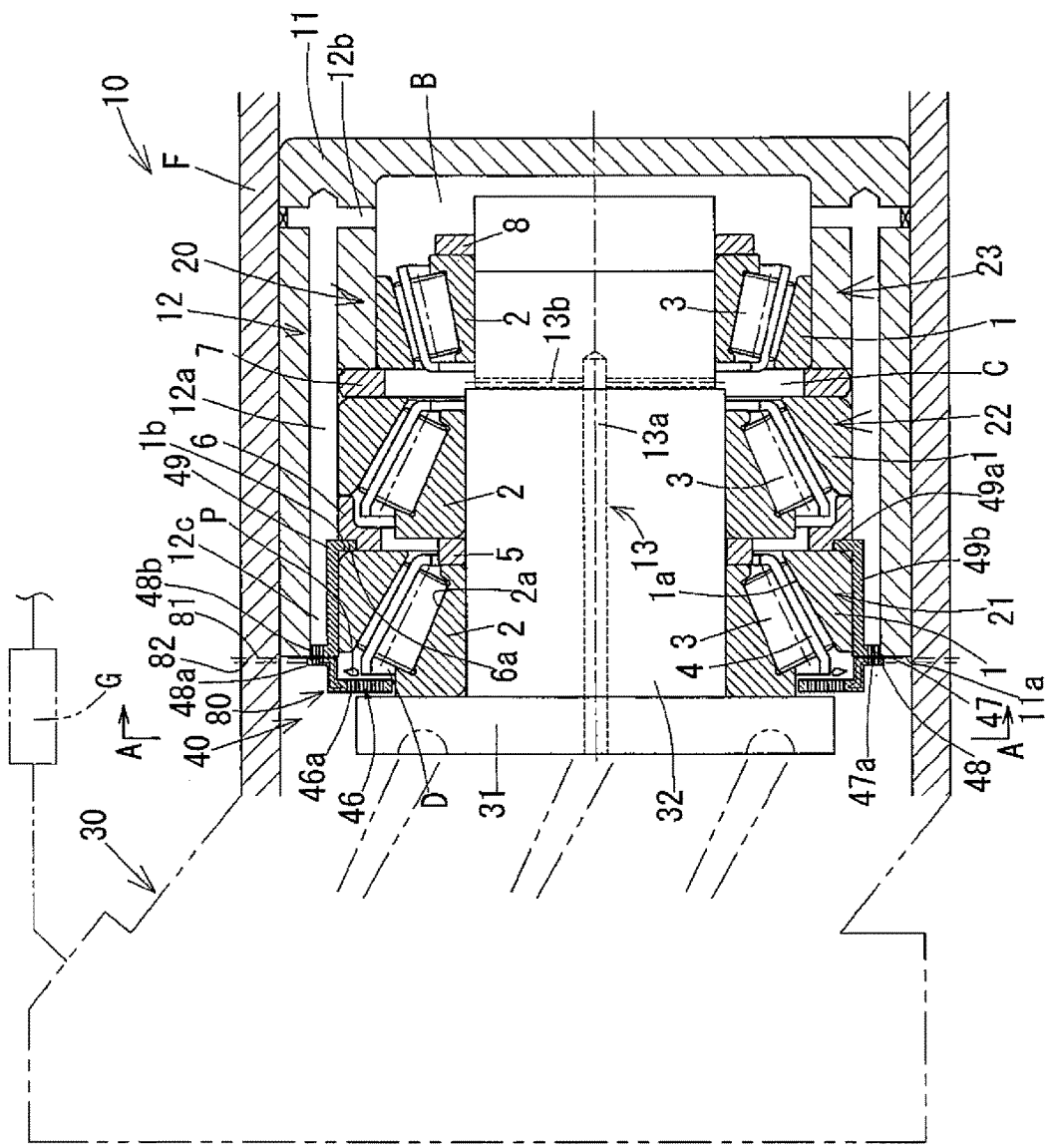
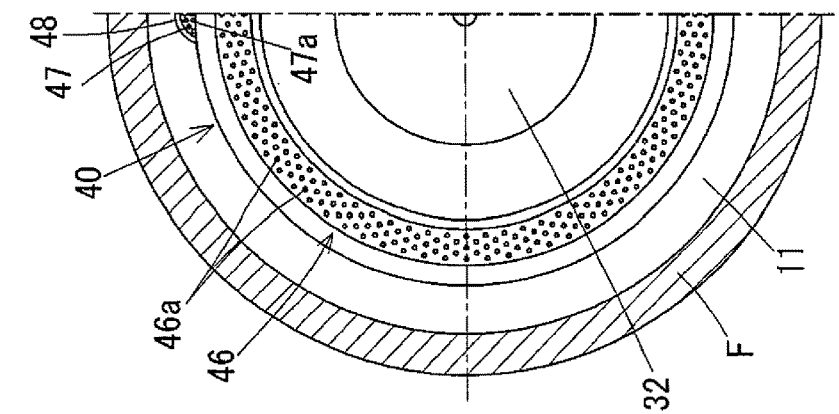
FIG. 8 (a)
FIG. 8 (b)

ROLLING BEARING WITH ABNORMALITY DETECTOR

TECHNICAL FIELD

The present invention relates to an abnormality detector for a rolling bearing lubricated by oil.

BACKGROUND ART

Rolling bearings are mounted to moving parts of transportation machines, industrial machines, or various other machines. Some of such machines include an operation mechanism which needs to be lubricated by oil, such as the portions of gears meshing with each other, or the portions of components in sliding contact with each other, and are configured such that the operation mechanism and the rolling bearings are lubricated by common oil.

For example, devices such as oil pumps include, in their interiors, a rolling bearing and an operation mechanism, and are capable of sending lubricating oil contained in the devices toward an outside operation mechanism located outside of the devices.

Foreign matter such as wear dust (iron dust, etc.) may occur in the bearing space of the rolling bearing of such a device. If foreign matter enters the operation mechanisms located midway of the circulation path through which lubricating oil circulates, such entry may reduce the durability of the device, damage the device, or cause the device to malfunction or fail to operate in an accurate manner.

In order to overcome such a problem, for example, Japanese Unexamined Patent Application Publication No. H07-280180 (hereinafter JP H07-280180) discloses an iron dust contamination detecting method for detecting the contamination of lubricating oil by iron dust such that a waning is sent when, if foreign matter such as iron dust enters lubricating oil flowing in a circulation path, the foreign matter is attracted to magnets mounted to a sensor, and accumulates on the magnets such that a metal casing and the magnets are electrically connected to each other through the accumulated foreign matter.

As described above, it is not preferable that foreign matter such as wear dust (iron dust, etc.) occurring in the rolling bearing enters the operation mechanism located midway of the circulation path through which lubricating oil circulates. In particular, if the rolling bearing is used in an oil pump, large separated pieces occurring in the rolling bearing may damage components of the operation mechanism inside of the oil pump, and/or components of the operation mechanism located midway of the circulation path through which lubricating oil sent out by the oil pump circulates, or cause these component to malfunction or fail to operate in an accurate manner. Therefore, it is necessary to prevent foreign matter occurring in the rolling bearing from flowing out of the rolling bearing, and to detect the occurrence of such foreign matter.

In JP H07-280180, the magnets of the sensor face the interior of the circulation path through which lubricating oil circulates, but most foreign objects contained in lubricating oil flowing in the circulation path may pass by the magnets without being attracted to the magnets. Also, in JP H07-280180, the magnets attract/catch only a small amount of foreign matter necessary for detecting how much foreign matter is contained in lubricating oil, so that the remaining foreign matter may enter the operation mechanisms.

It is an object of the present invention to reliably prevent foreign matter such as wear dust (iron dust, etc.) occurring in a rolling bearing from flowing out of the bearing space of the rolling bearing, in particular, from entering an operation mechanism located midway of a circulation path through which lubricating oil circulates.

SUMMARY OF THE INVENTION

In order to achieve the above object, the present invention provides an abnormality detector for a rolling bearing comprising an outer race, an inner race, and rolling elements arranged in a bearing space between the outer race and the inner race, the abnormality detector comprising: a filter configured to prevent metal pieces contained in lubricating oil flowing through the bearing space from passing through the filter, while allowing the lubricating oil to pass through the filter; an electric circuit including a pair of electrodes, and lines extending from the respective electrodes to a power source; and an output detector configured to detect a change in electrical output from the electric circuit when metal pieces adhere between the pair of electrodes, thereby detecting a state of metal pieces contained in the lubricating oil.

The pair of electrodes of the electric circuit may comprise a pair of permanent magnets provided on the filter so as to be spaced apart from each other. Namely, the abnormality detector may comprise an electric circuit including a pair of permanent magnets as electrodes, and lines extending from the respective permanent magnets to a power source; and an output detector configured to detect a change in electrical output from the electric circuit when metal pieces adhere between the pair of permanent magnets, thereby detecting a state of metal pieces contained in lubricating oil.

The abnormality detector may be configured such that a magnetic member is arranged between the pair of permanent magnets such that gaps are defined between the magnetic member and the respective permanent magnets.

The abnormality detector may be configured such that the filter comprises a through hole through which lubricating oil flows, and the permanent magnets are arranged on respective sides of the through hole.

The abnormality detector may be configured such that the electrical output comprises a voltage-divided output from the electric circuit.

The abnormality detector may be configured such that the pair of electrodes, which comprise the pair of permanent magnets, is one of a plurality of pairs of electrodes of the abnormality detector, the plurality of pairs of electrodes comprising pairs of permanent magnets, and arranged such that gaps that are different in size from each other are defined between the respective pairs of electrodes.

The abnormality detector may be configured such that the electric circuit further includes terminals on a circuit substrate, the pair of permanent magnets include, on surfaces of the respective permanent magnets, coating layers made of an electrically conductive material, and the coating layers are electrically connected to the terminals of the electric circuit.

The abnormality detector may be configured such that the output detector is capable of judging, based on a predetermined threshold value and the electrical output from the electric circuit, that the rolling bearing is in an abnormal state.

The abnormality detector may further comprise: a data storage means (server for data storage) configured to store information when the output detector judges that the rolling bearing is in an abnormal state; and a chronological change confirming means configured to confirm chronological changes in abnormal state of the rolling bearing based on past judgement information stored in the data storage means.

The present invention also provides a bearing unit including the above rolling bearing, which comprise an outer race, an inner race, and rolling elements arranged in a bearing space between the outer race and the inner race, the bearing unit further comprising: an operation mechanism located outside of the bearing space and including moving parts lubricated by lubricating oil; a seal member mounted to one of the outer race, a member fixed to the outer race, the inner race, and a member fixed to the inner race, and covering a lubricating oil path extending from the bearing space to the operation mechanism; wherein the seal member is provided with the filter so as to catch foreign matter contained in lubricating oil flowing from the bearing space to the operation mechanism through the filter, wherein the pair of electrodes are mounted to the seal member, and wherein the pair of electrodes, the electric circuit, and the output detector constitute a sensor device configured to electrically detect foreign matter comprising metal adhering between the pair of electrodes; and an anti-rotation means mounted between the seal member and the one of the outer race, the member fixed to the outer race, the inner race, and the member fixed to the inner race, and fixing the seal member such that the seal member is non-rotatable relative to the one of the outer race, the member fixed to the outer race, the inner race, and the member fixed to the inner race.

The bearing unit may be configured such that the seal member includes a wall portion covering a side opening of the bearing space of the rolling bearing, and provided with the filter extending along a circumferential direction of the wall portion of the seal member, and the sensor device is mounted to the filter.

The bearing unit may further comprise a housing fixed in position radially outwardly of the outer race, and having a circulation path through which lubricating oil circulates, and may be configured such that the anti-rotation means comprises a protrusion provided on the seal member, and inserted in the circulation path.

The bearing unit may be configured such that the circulation path opens to a portion of an end surface of the housing located radially outwardly of the side opening of the bearing space of the rolling bearing, and the protrusion of the seal member comprises a circulation path closing portion including an additional filter, and axially protruding into the circulation path while passing through the opening of the circulation path.

The bearing unit may be configured such that the pair of electrodes of the sensor device are located on a side of the filter facing the bearing space so as to be spaced apart from each other, and the lines, extending from the respective electrodes to the power source, include portions provided at a circumferential position of the seal member where there is the anti-rotation means, and extending to an outside space of the rolling bearing.

The bearing unit may be configured such that the pair of electrodes of the sensor device are located on a side of the filter facing the bearing space so as to be spaced apart from each other, and the lines, extending from the respective electrodes to the power source, include portions drawn from the circulation path closing portion to an outside space of the rolling bearing.

Effects of the Invention

The present invention provides an abnormality detector for a rolling bearing, the abnormality detector comprising a filter configured to prevent metal pieces contained in lubricating oil flowing through the bearing space of the rolling bearing from passing through the filter, while allowing the lubricating oil to pass through the filter so as to flow to the outside of the bearing space, and provided with a pair of permanent magnets spaced apart from each other; an electric circuit including the pair of permanent magnets as a pair of electrodes, and lines extending from the respective electrodes to a power source; and an output detector configured to detect a change in electrical output from the electric circuit when metal pieces adhere between the pair of permanent magnets, thereby detecting the state of metal pieces contained in the lubricating oil. Therefore, it is possible to reliably prevent foreign matter or objects such as iron dust or separated pieces occurring in the rolling bearing from entering an operation mechanism located midway of the circulation path in which lubricating oil circulates, and also to detect, due to an electrical change, that the rolling bearing is in an abnormal state. As a result thereof, it is possible to prevent the malfunction of related components beforehand.

The present invention also provides a bearing unit including the rolling bearing, and further comprising a seal member covering a lubricating oil path extending from the bearing space to an operation mechanism located outside of the rolling bearing, and provided with the filter so as to catch foreign matter contained in lubricating oil flowing from the bearing space to the operation mechanism through the filter; a sensor device mounted to the seal member, and configured to electrically detect foreign matter comprising metal adhering between the pair of electrodes; and an anti-rotation means mounted between the seal member and one of an outer race, an inner race, and a bearing member to which the seal member is fixed, and fixing the seal member such that the seal member is non-rotatable relative to the one of the outer race, the inner race, and the bearing member. Therefore, it is possible to reliably protect the function of the sensor device, and reliably catch foreign matter such as wear dust (iron dust) occurring in the rolling bearing so as to prevent such foreign matter from entering the outside operation mechanism.

BRIEF DESCRIPTION OF THE DRAWINGS

FIG. 8(b) is a vertical sectional view of an oil pump device according to a second embodiment of the present invention.

FIG. 8(a) is a sectional view taken along line A-A of FIG. 8(b).

DETAILED DESCRIPTION OF THE INVENTION

Figure 1:
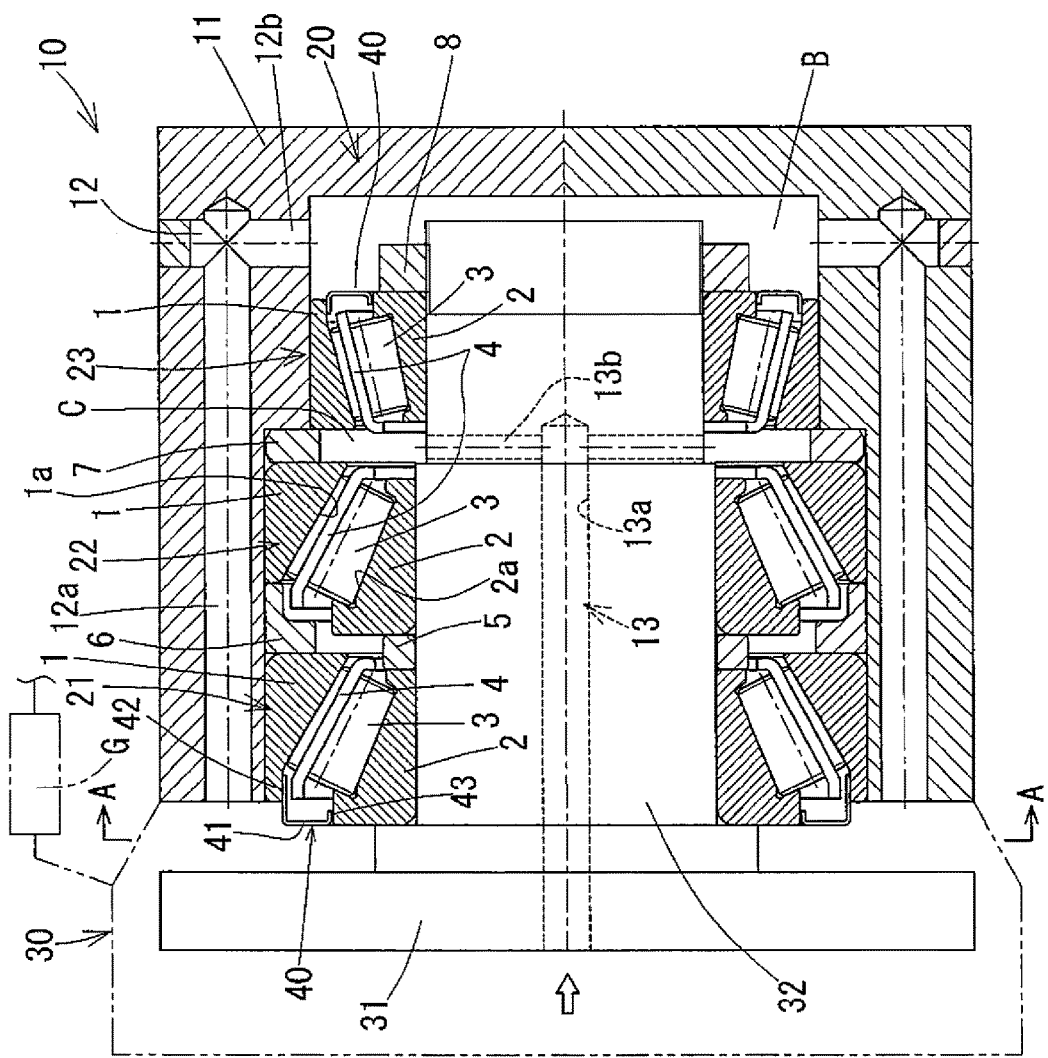
FIG. 1(a) is a side view of an oil pump device according to a first embodiment of the present invention, the oil pump device including a bearing unit provided with a plurality of rolling bearings and filters.
FIG. 1(b) is a vertical sectional view of the oil pump device.
Figure 1:
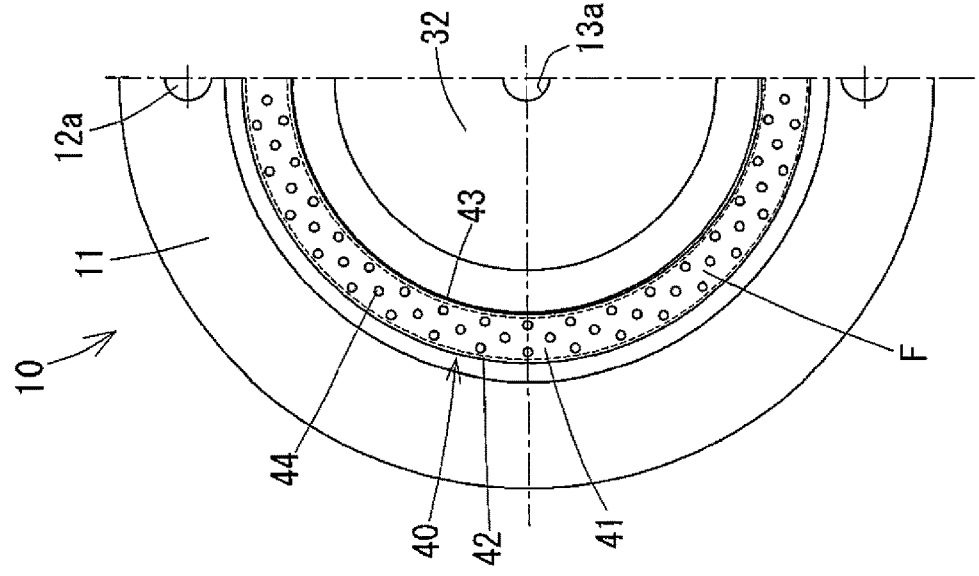
Figure 2:
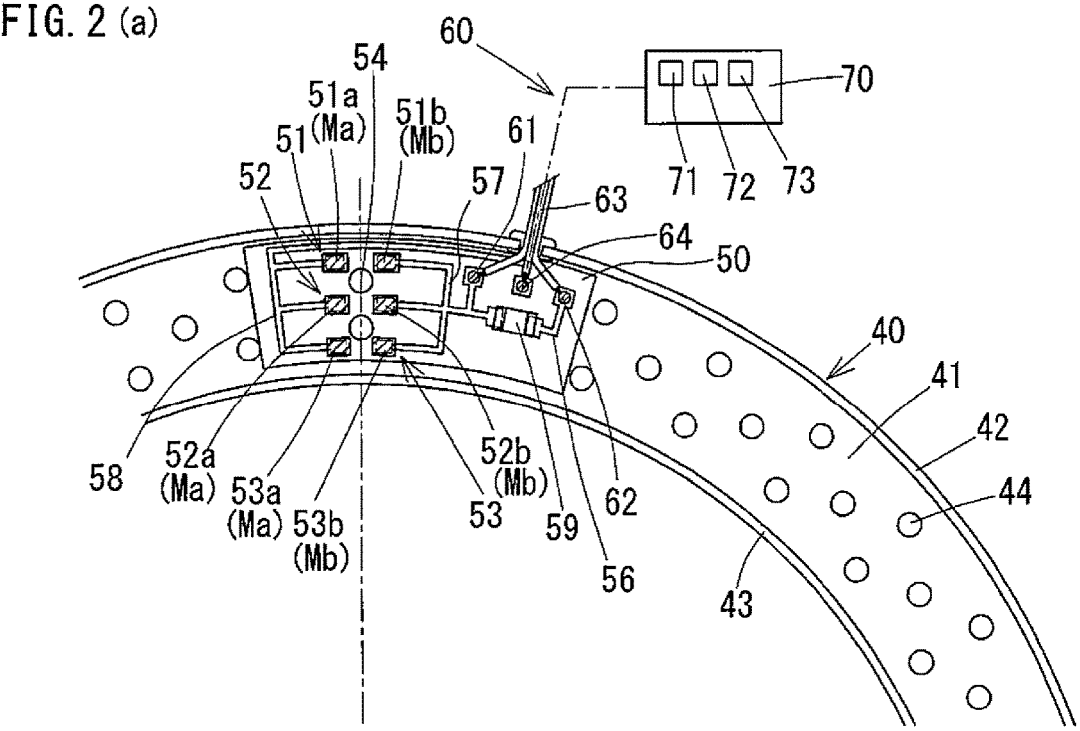
FIG. 2(a) is a side view illustrating the portion of each filter on which a single sensor output is produced.
FIG. 2(b) is a side view illustrating the portion of each filter on which three sensor outputs are produced.
Figure 2:
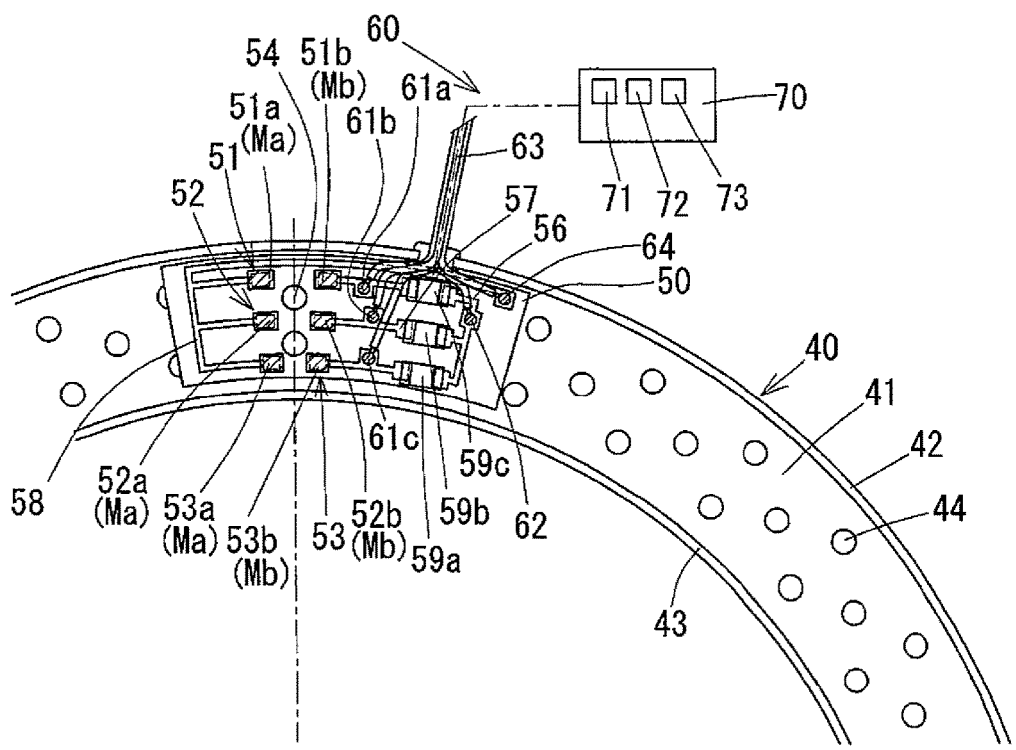

An oil pump device 10 according to the first embodiment of the present invention is now described with reference to FIGS. 1 to 7. The oil pump device 10 includes abnormality detectors for rolling bearings.

The oil pump device 10 further includes, in its interior, a bearing unit 20, and an operation mechanism 30.

The bearing unit 20 includes three rolling bearings 21, 22 and 23 arranged in juxtaposition with each other in a fixed housing 11, and lubricated by oil. A shaft member 32 is connected to the operation mechanism 30 and supported by the rolling bearings 21, 22 and 23 so as to be rotatable about the center axis of the shaft member 32 relative to the fixed housing 11.

Each of the rolling bearings 21, 22 and 23 includes an outer race 1 having a raceway 1a; an inner race 2 having a raceway 2a; rolling elements 3 arranged between the raceway 1a of the outer race 1 and the raceway 2a of the inner race 2; and a retainer 4 retaining the rolling elements 3 in the circumferential direction.

The outer races 1 of the rolling bearing 21, 22 and 23 are press-fitted and fixed to the inner diameter surface of the housing 11 so as to be non-rotatable relative to the housing 11. The inner races 2 of the rolling bearing 21, 22 and 23 are press-fitted and fixed to the outer periphery of the shaft member 32 so as to be non-rotatable relative to the shaft member 32.

While, as the rolling bearings 21, 22 and 23, tapered roller bearings are used which include tapered rollers as the rolling elements 3 in the embodiment, rolling bearings other than tapered roller bearings may be used. Also, while three rolling bearings are used in the embodiment, the number of rolling bearings arranged in the housing 11 is not limited to three, and may be freely altered in accordance with the specifications of the device.

The operation mechanism 30 of the oil pump device 10 includes a rotor (not shown) for a pump rotatably mounted in a pump casing so as to send lubricating oil into a lubrication path. The rotor is connected to a connection member 31 provided on the end of the shaft member 32 so as to be rotatable about the center axis of the shaft member 32. A driving force is input to the rotor from a driving source (not shown).

As illustrated in FIG. 1(b), among the three rolling bearings 21, 22 and 23, the rolling bearings 21 and 22, which are located near one axial end of the device 10 on which the operation mechanism 30 is located, are arranged such that the small-diameter end surfaces of the tapered rollers of the rolling bearings 21 and 22 are directed toward the other axial end of the device 10 opposite from the one axial end thereof, i.e., opposite from the operation mechanism 30.

The other rolling bearing 23, which is located closest to the other axial end of the device 10 (i.e., remotest from the operation mechanism 30) is arranged such that the small-diameter end surfaces of the tapered rollers of the rolling bearing 23 are directed toward the operation mechanism 30. Namely, the rolling bearings 21 and 22 are arranged in a back-to-back relationship with the rolling bearing 23, which means that the small-diameter end surfaces of the tapered rollers of the bearings 21 and 22 face toward the small-diameter end surfaces of the tapered rollers of the bearing 23. Therefore, the rolling bearings 21 and 22 near the one axial end are each arranged such that the distance between the raceway 1a of the outer race 1 and the raceway 2a of the inner race 2 decreases toward the other axial end, whereas the rolling bearing 23 near the other axial end is arranged such that the distance between the raceway 1a of the outer race 1 and the raceway 2a of the inner race 2 increases toward the other axial end.

As illustrated in FIG. 1(b), spacers 5 and 6 are arranged between the axially adjacent rolling bearings 21 and 22, and a spacer 7 is arranged between the axially adjacent rolling bearings 22 and 23.

Specifically, the spacer 5 is arranged between the inner diameter portions of the rolling bearings 21 and 22 so as to abut against the end surfaces of the inner races 2 of the rolling bearings 21 and 22. The spacer 6 is arranged between the outer diameter portions of the rolling bearings 21 and 22 so as to abut against the end surfaces of the outer races 1 of the rolling bearings 21 and 22.

The spacer 7 is arranged between the outer diameter portions of the rolling bearings 22 and 23 so as to abut against the end surfaces of the outer races 1 of the rolling bearings 22 and 23. Though not illustrated in FIG. 1(b), an additional spacer is arranged between the inner diameter portions of the rolling bearings 22 and 23 so as to abut against the end surfaces of the inner races 2 of the rolling bearings 22 and 23. This additional spacer extends along the circumferential direction of the rolling bearings 22 and 23 so as not to close openings of radial circulation path portions 13b for lubricating oil that are located at the outer diameter surface of the shaft member 32.

The end of the rolling bearing 21 directed toward the one axial end of the device 10 is fixed in position by the end surface of the flange-shaped connection member 31, which is on the end of the shaft member 32, and the end of the rolling bearing 23 directed toward the other axial end of the device 10 is fixed in position by the end surface of a presser 8 so that the rolling bearings 21, 22 and 23 are axially unmovable relative to the shaft member 32. By fixing these ends by the connection member 31 and the presser 8, a preload is applied to the rolling bearings (tapered roller bearings).

The shaft member 32, supported by the housing 11 through the rolling bearings 21, 22 and 23, is connected to the operation mechanism 30 of the oil pump device. The oil pump device is capable of sending lubricating oil contained in the oil pump device to an external operation mechanism G. The lubricating oil sent out of the oil pump device flows through an oil path, lubricates the operation mechanism G, and returns to the oil pump device.

The oil pump device is configured such that the bearing unit 20 and the operation mechanism 30 are lubricated by common lubricating oil. The operation mechanism 30 and the bearing space of the bearing unit 20 communicate with each other through circulation paths 12 and 13 through which lubricating oil circulates. The lubricating oil is also sent to the external operation mechanism G.

In the embodiment, the circulation path 13 comprises an axial circulation path portion 13a axially extending from the operation mechanism 30 such that the center axis of the path portion 13a is located on the center axis of the shaft member 32, and the above-mentioned radial circulation path portions 13b, extending radially outwardly from the end of the axial circulation path portion 13a, and opening to the outer peripheral surface of the shaft member 32. The radial circulation path portions 13b open to or communicate with the annular space C defined between the rolling bearings 22 and 23. Therefore, the circulation path 13 communicates, through the annular space C, with the bearing spaces of the rolling bearings near the one axial end of the device 10 (left side of FIG. 1(b)), i.e., the rolling bearings 21 and 22, and with the bearing space of the rolling bearing near the other axial end of the device 10 (right side of FIG. 1(b)), i.e., the rolling bearing 23.

The lubricating oil that has passed through the annular space C, and then through the bearing space of the rolling bearing 23 flows, through the opening of the bearing space of the rolling bearing 23 at the other axial end thereof, into a housing end space B defined between the other axial end of the rolling bearing 23 and the housing 11. Thereafter, the lubricating oil flows through circulation paths 12 in the housing 11, and returns to the operation mechanism 30.

Each circulation path 12 comprises a radial circulation path portion 12b extending radially outwardly from the housing end space B, and an axial circulation path portion 12a axially extending, in the direction of the center axis of the shaft member 32, from the radial circulation path portion 12b.

The lubricating oil that has passed through the annular space C, the bearing space of the rolling bearing 22, and the bearing space of the rolling bearing 21 returns, through the opening of the bearing space of the rolling bearing 21 at the one axial end thereof, to the operation mechanism 30.

In this way, the operation mechanism 30, and the rolling bearings 21, 22 and 23 of the bearing unit 20 are lubricated by common lubricating oil.

Foreign matter such as wear dust (including iron dust) may occur in the bearing spaces of the rolling bearings 21, 22 and 23. It is not preferable that such foreign matter enters the operation mechanism 30 and other operation mechanisms located in the midway portion of the circulation path. In order to prevent foreign matter from entering these mechanisms, a seal ring 40 with a filter F is attached to the opening of the bearing space of the rolling bearing 21 at the one axial end thereof, and a seal ring 40 with a filter F is attached to the opening of the bearing space of the rolling bearing 23 at the other axial end thereof. These seal rings 40 have the same structure as described below.

The seal rings 40 are attached to the respective rolling bearings 21 and 23 so as to cover the above openings of the bearing spaces of the rolling bearings 21 and 23. These openings are annular-shaped openings defined along the raceways 1a of the outer races 1 and the raceways 2a of the inner races 2 of the respective rolling bearings 21 and 23. Therefore, the seal rings 40, covering these openings, are also annular-shaped rings.

In the embodiment, the seal rings 40 are made of a synthetic resin. The seal rings 40, made of a synthetic resin, are each attached between the large-diameter flange of the inner race 2 and the large-diameter end of the inner diameter surface of the outer race 1.

The outer races 1 of the bearings 21, 22 and 23 are stationary, and the inner races 2 of the bearings 21, 22 and 23 are rotatable. The seal rings 40 are fixed, in the embodiment, to the stationary outer races 1 of the respective bearings 21 and 23 by e.g., fitting, but may be fixed to the rotatable inner races 2 of the respective bearings 21 and 23 by e.g., fitting.

As illustrated in FIGS. 1(a) and 1(b), each seal ring 40 includes an engagement portion 42 engaged with the outer race 1; a wall portion 41 extending radially inwardly from the engagement portion 42; and inner cylindrical portion 43 extending from the wall portion 41 so as to be opposed to the outer diameter surface of the inner race 2. The engagement portion 42 is a cylindrical member press-fitted to the inner diameter surfaces of the outer race 1. The engagement portion 42 may be fixed to the outer race 1 by fitting a protrusion or protrusions on the outer diameter surface of the engagement portion 42 in a seal groove or grooves in the large-diameter end of the inner diameter surface of the outer race 1. The inner cylindrical portion 43, located radially inwardly of the seal ring 40, is in sliding contact with, or opposed, through a minute gap, to the outer diameter surface of the large-diameter flange of the inner race 2.

A large number of through holes 44 are provided in the wall portion 41 of each seal ring 40, and prevent foreign matter in the bearing spaces of the rolling bearings 21 and 22 or in the bearing space of the rolling bearing 23 from passing through the through holes 44, while allowing lubricating oil to pass through the through holes 44. The maximum value of the diameters of the through holes 44 is appropriately set such that only foreign matter which will not adversely affect the operation mechanism 30 even if it enters the operation mechanism 30 is allowed to pass through the through holes 44.

The oil pump device 10 further includes an electric-circuit 60 including pairs of permanent magnets Ma and Mb (51a and 51b, 52a and 52b, 53a and 53b) provided on the inner side surface of the filter F of each of the seal rings 40 so that each pair of permanent magnets are spaced apart from each other. The electric circuit 60 further includes lines extending to a power supply from the pairs of permanent magnets Ma and Mb, which function as electrodes, and is controlled by a control means 70.

The permanent magnets Ma and Mb, and the lines connected to the permanent magnets Ma and Mb so as to supply electricity to the permanent magnets are mounted on a substrate 50. The lines of the electric circuit 60 extend from the substrate 50 to the outside of the rolling bearing 21, 23, and the portions of the lines of the electric circuit 60 extending to the outside of the rolling bearing, and the control means 70 are mounted to a fixed member such as the housing 11 or a frame near the housing 11.

The permanent magnets Ma and Mb function to attract foreign matter or objects such as iron dust or iron pieces, and further function, as electrodes of the electric circuit 60, to detect the adhesion of foreign matter or objects to the permanent magnets. Namely, the permanent magnets Ma and Mb have a magnetic force to attract metal, and include coating surface layers (conductive layers) made of an electrically conductive material. Terminals and the lines of the electric circuit 60, and the coating layers of the permanent magnets are electrically connected together.

The permanent magnets Ma and Mb may be Nd magnets having their surfaces plated with nickel. This type of permanent magnets Ma and Mb make it possible to solder lines formed by the pattern on the substrate 50 to the magnets. Since nickel plating is an excellent conductor, this type of permanent magnets Ma and Mb can more reliably detect the adhesion of foreign matter thereto. More preferably, the coating layers covering the surfaces of the permanent magnets Ma and Mb comprise gold, silver or copper plating. Alternatively, the permanent magnets Ma and Mb may be entirely made of an electrically conductive material.

As illustrated in FIGS. 2(a) and 2(b), the substrate 50 is provided with holes 54, and the permanent magnets Ma and Mb are fixed to the substrate 50 such that each pair of permanent magnets are located on both sides of the holes 54. The positions of the holes 54 coincide with the positions of some of the through holes 44 of the filter F, through which lubricating oil flows, so that each pair of permanent magnets Ma and Mb are also arranged on both sides of the some of the through holes 44. While, in FIGS. 2(a) and 2(b), each pair of permanent magnets Ma and Mb are located on both sides of the holes 54 in the circumferential direction of the rolling bearing, they may be located on both sides of the holes 54 in the radial direction of the rolling bearing.

In order to enable the permanent magnets to more effectively attract foreign matter thereto, the substrate 50 is preferably fixed to one of the opposite surfaces of the wall portion 41 facing the bearing space.

Figure 3:
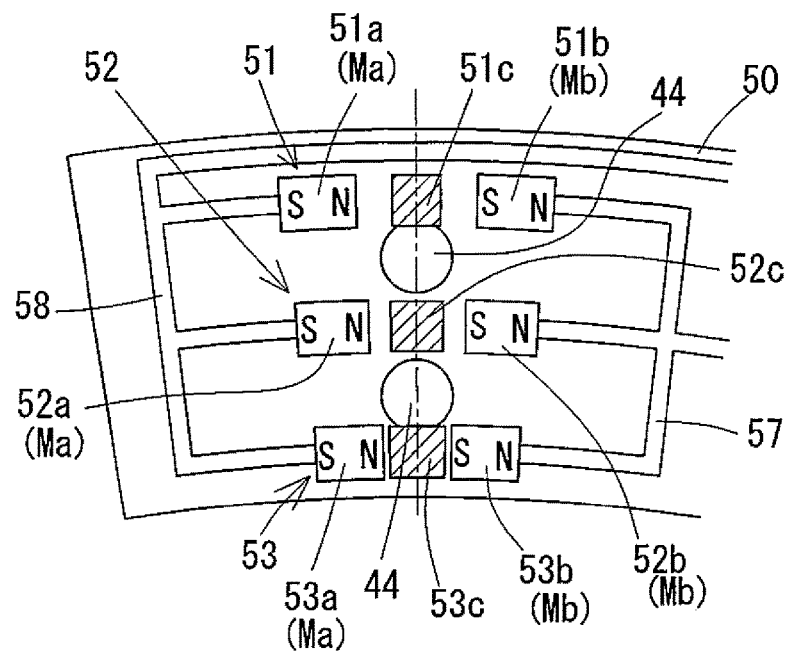
FIG. 3 is an enlarged view illustrating the portion of each filter on which three sensor outputs are produced, and magnetic members are arranged between respective pairs of electrodes comprising pairs of permanent magnets.
Figure 4:
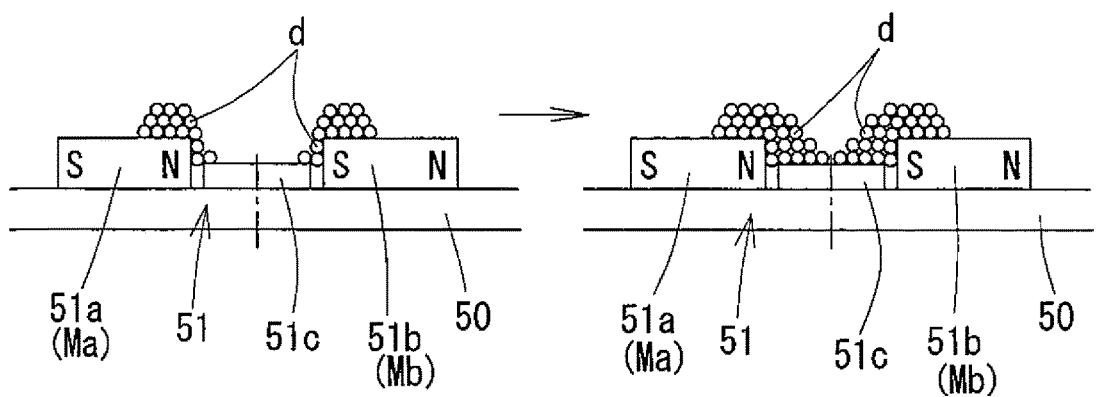
FIGS. 4(a) and 4(b) are schematic sectional views each illustrating iron dust adhering to the electrodes arranged on a substrate.

As illustrated in FIG. 3, magnetic members 51c, 52c and 53c such as metal members or magnets may be arranged between the respective pairs of permanent magnets Ma and Mb such that gaps are defined between each of the magnetic members 51c, 52c and 53c and the corresponding pair of permanent magnets Ma and Mb. By mounting the magnetic members 51c, 52c and 53c in this way, it is possible to attract more foreign matter as illustrated in FIGS. 4(a) and 4(b).

In FIG. 2(a), the electric circuit 60 includes a fixed resistor 59 on the substrate 50. One end of the fixed resistor 59 is connected to an input terminal (power source) 62 through a line 56 which is a portion of the pattern on the substrate 50, and the other end of the fixed resistor 59 is connected to a line 57 which is also a portion of the pattern on the substrate 50. The line 57 includes a main line portion connected to the fixed resistor 59, and three branches extending from the main line portion and connected at their distal ends to the respective three permanent magnets Mb.

A line 58 which is also a portion of the pattern on the substrate 50 is connected to the other permanent magnets Ma. That is, the line 58 includes a main line portion, and three branches extending from the main line portion, and connected at their distal ends to the respective three permanent magnets Ma. The main line portion of the line 58 is connected, at its end opposite from the permanent magnets Ma, to a ground (GND) terminal 64.

The line 57 further includes an additional branch extending from a point of the main line portion between the fixed resistor 59 and the three branches, and connected to an output terminal 61 constituting a portion of a voltage dividing circuit. The electric circuit 60 of FIG. 2(a) thus produces a single sensor output.

In FIG. 2(b), the electric circuit 60 includes three fixed resistors 59a, 59b and 59c on the substrate 50. Each of the three fixed resistors is connected, at one end thereof, to an input terminal (power source) 62 through a line 56 which is a portion of the pattern on the substrate 50, and, at the other end, to one end of a corresponding one of three parallel lines 57 which are also portions of the pattern on the substrate 50. The other ends of the three lines 57 are connected to the respective permanent magnets Mb.

A line 58 which is also a portion of the pattern on the substrate 50 is connected to the other permanent magnets Ma. That is, the line 58 includes a main line portion, and three branches extending from the main line portion, and connected at their distal ends to the respective three permanent magnets Ma. The end of the main line portion of the line 58 opposite from the permanent magnets Ma is connected to a ground (GND) terminal 64.

Three branches extend from points of the respective three lines 57 between the permanent magnets Ma and the respective fixed resistors 59a, 59b and 59c, and are connected to respective output terminals 61a, 61b and 61c. The output terminals 61a, 61b and 61c each constitutes a portion of a corresponding one of mutually independent voltage dividing circuits. The electric circuit 60 of FIG. 2(b) thus produces three sensor outputs.

FIG. 7(a) illustrates a diagram of an electric circuit that produces a single sensor output, in which R1 corresponds to the electrical resistance of the fixed resistor 59, and R2, R3 and R4 correspond, respectively, to the electrical resistance between the permanent magnets 51a and 51b, the electrical resistance between the permanent magnets 52a and 52b, and the electrical resistance between the permanent magnets 53a and 53b. FIG. 7(b) illustrates a diagram of an electric circuit that produces three sensor outputs, in which R1, R2 and R3 correspond, respectively, to the electrical resistance of the fixed resistor 59a, the electrical resistance of the fixed resistor 59b, and the electrical resistance of the fixed resistor 59c, and R4, R5 and R6 correspond, respectively, to the electrical resistance between the permanent magnets 51a and 51b, the electrical resistance between the permanent magnets 52a and 52b, and the electrical resistance between the permanent magnets 53a and 53b.

The control means 70 controls the electric circuit 60 through a cable 63 extending to the control means 70 from the input terminal (power source) 62, the GND terminal 64, and the output terminal 61 or terminals 61a, 61b and 61c.

The control means 70 includes an output detector 71 configured to detect an output or outputs from the voltage dividing circuit or circuits of the electric circuit 60. Specifically, the output detector 71 detects a change in electrical output from the electric circuit 60 when foreign objects such as metal pieces adhere between the pairs of permanent magnets Ma and. Mb, thus detecting the state of metal pieces contained in lubricating oil.

The electrical output(s) detected by the output detector 71 is a voltage-divided output(s) from the electric circuit. For example, the voltage-divided output(s) is the electric potential of the output terminal 61 or the electric potentials of the output terminals 61a, 61 and 61c (the output terminal(s) is located between the input terminal (power source) 62 of which the electric potential is E(V) and the GND terminal 64 of which the electric potential is 0(V)).

When lubricating oil flows through the bearing spaces of the rolling bearings, and passes through the through holes 44 of the filter F of the seal ring 40 which carries the electric circuit 60, if the lubricating oil contains foreign matter or objects capable of being attracted to magnets, such as iron dust or separated iron pieces, such foreign objects adhere to the permanent magnets Ma and Mb, causing an electrical short-circuit between the opposed permanent magnets (electrodes), so that the resistance value between the opposed electrodes decreases.

The electrical resistance between the pairs of permanent magnets Ma and Mb changes according to how iron dust, separated iron pieces, etc. are attracted to the magnets. Generally speaking, if the amount of foreign matter attracted to the pairs of magnets is small, since the sectional area of the portion of the foreign matter through which electric current can pass is small, the resistance value therebetween tends to be large. On the other hand, if the amount of foreign matter attracted to the pairs of magnets is large, since the sectional area of the portion of the foreign matter through which electric current can pass is large, the resistance value therebetween tends to be small.

As illustrated, by way of example, in FIGS. 4(a) and 4(b), as the amount of foreign matter attracted to the pairs of permanent magnets Ma and Mb increases, the electrical resistance value between the permanent magnets Ma and Mb decreases, namely, the electric potential of the output terminal 60 or the electric potentials of the terminals 61a, 61b and 61c gradually decrease, so that the output voltage(s) detected by the output detector 71 also decreases. Therefore, by comparing the electric potential(s) (voltage-divided output(s)) of the output terminal 60 or terminals 61a, 61b and 61c with the electric potential of the input terminal (power source) 62 and the electric potential of the GND terminal 64, it is possible to estimate the amount of foreign matter attracted to the magnets. It is possible to calculate beforehand, through e.g., experiments, the relationship between the output voltage(s) (electric potential(s) of the output terminal 60 or terminals 61a, 61b and 61c=voltage-divided output(s)) and the amount of foreign matter attracted to the magnets. The thus-obtained information may be stored in the below-described data storage means 72.

Preferably, the control means 70 has a predetermined threshold value of the output voltage(s), and is configured to determine that the rolling bearings are in an abnormal state if the electrical output(s) from the output terminal 61 or terminals 61a, 61b and 61c falls below the predetermined threshold value.

The control means 70 further includes the above-mentioned data storage means 72, which is configured to store information when the output detector 71 judged that the rolling bearings are in an abnormal state; and a chronological change confirming means 73 configured to confirm the chronological changes in the abnormal state of the rolling bearings on the basis of the past judgement information stored in the data storage means 72 regarding the past abnormality judgement by the output detector 71. This makes it easier for the control means 70 to learn, with respect to each bearing unit 20, the relationship between the output voltage(s) (electric potential(s) of the output terminal 60 or terminals 61a, 61b and 61c=voltage-divided output(s)) and the amount of foreign matter attracted to the magnets, and to determine the remaining operating time of the bearing unit 20 until an abnormal state is detected.

An experimental result shows that if, as illustrated in FIGS. 2(a) and 2(b), the magnetic members 51c, 52c and 53c are not arranged between the respective pairs of permanent magnets Ma and Mb, foreign matter tends to adhere predominantly to the surfaces of the permanent magnets Ma and Mb, whereas if, as illustrated in FIG. 3, the magnetic members 51c, 52c and 53c are arranged between the respective pairs of permanent magnets Ma and Mb, foreign matter tends to adhere to both the permanent magnets Ma and Mb and the magnetic members 51c, 52c and 53c such that the magnets and the magnetic members are connected together through the foreign matter.

The above experimental result thus indicates that if the magnetic members 51c, 52c and 53c are arranged in the magnetic fields between the respective pairs of permanent magnets Ma and Mb, magnetic and electric short-circuits are more likely to occur. Actually, however, it is necessary to define, between the magnetic members 51c, 52c and 53c and the respective pairs of permanent magnets Ma and Mb, gaps which are minute but sufficiently large to prevent the occurrence of electric short-circuiting due to factors other than the adhesion of foreign matter to the magnets.

In the embodiment, (plural) pairs of electrodes comprising the pairs of permanent magnets Ma and Mb are arranged on the substrate 50 such that gaps having different sizes are defined between the respective pairs of electrodes. Specifically, in each of FIGS. 2(a) and 2(b), the gap between the radially outer permanent magnets 51a and 51b is larger than the gap between the radially intermediate permanent magnets 52a and 52b, and the gap between the magnets 52a and 52b is larger than the gap between the radially inner permanent magnets 53a and 53b. Also, in FIG. 3, the gaps between the magnetic member 51c and the radially outer permanent magnets 51a and 51b are larger than the gaps between the magnetic member 52c and the radially intermediate permanent magnets 52a and 52b, and the gaps between the member 52c and the magnets 52a and 52b are larger than the gaps between the magnetic member 53c and the radially inner permanent magnets 53a and 53b. These arrangements make it possible to generate electric short-circuits between at least one of the pairs of permanent magnets Ma and Mb for foreign objects of a wider variety of sizes.

Figure 5:
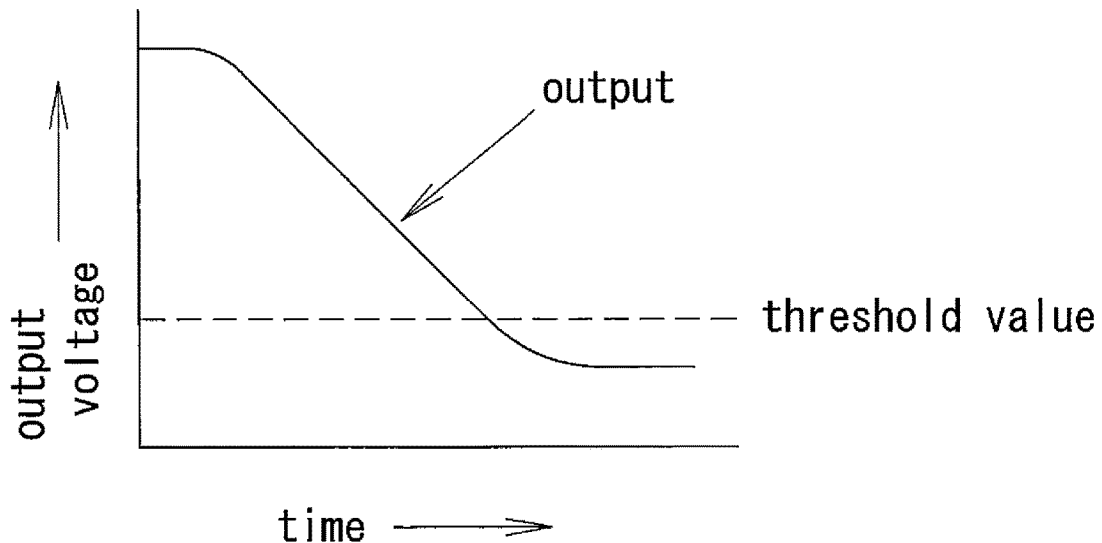
FIG. 5 is a graph illustrating electrical output from an electric circuit that produces a single sensor output.
Figure 6:
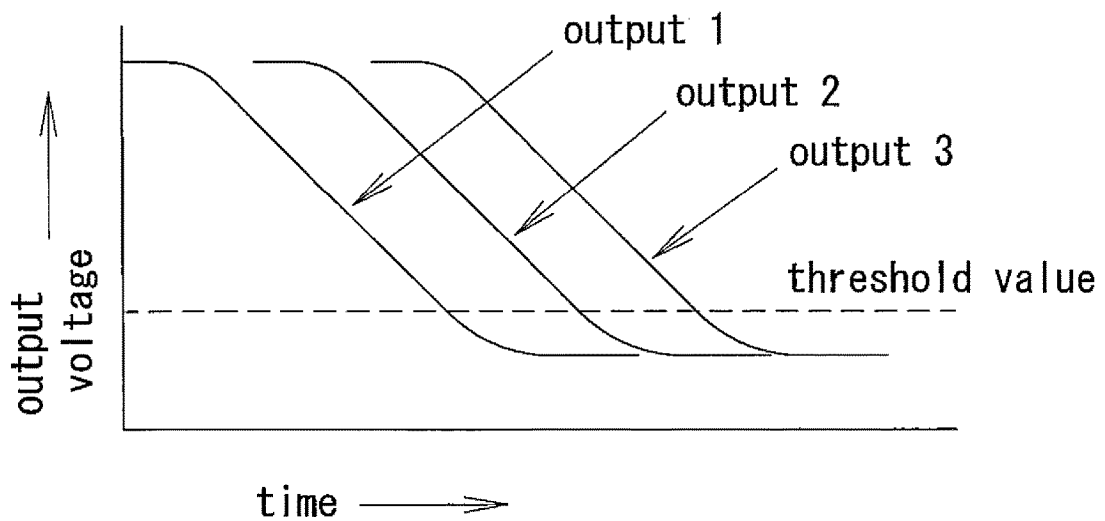
FIG. 6 is a graph illustrating electrical output from an electric circuit that produces three sensor outputs.
Figure 7:
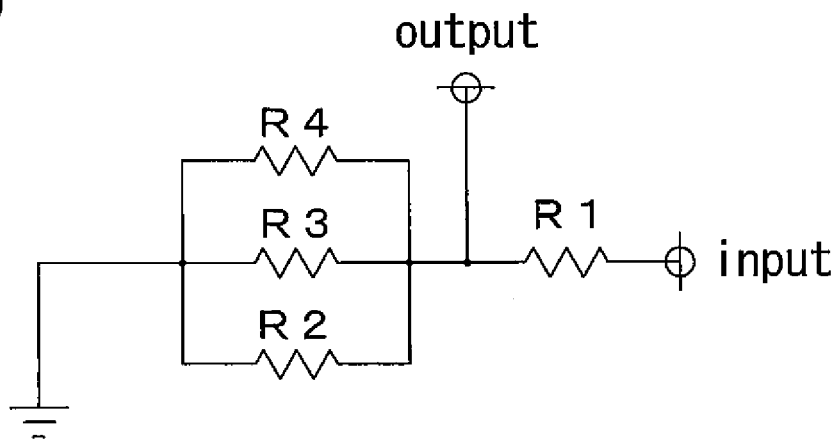
FIG. 7(a) is a diagram of the electric circuit that produces a single sensor output.
FIG. 7(b) is a diagram of the electric circuit that produces three sensor outputs.
Figure 7:
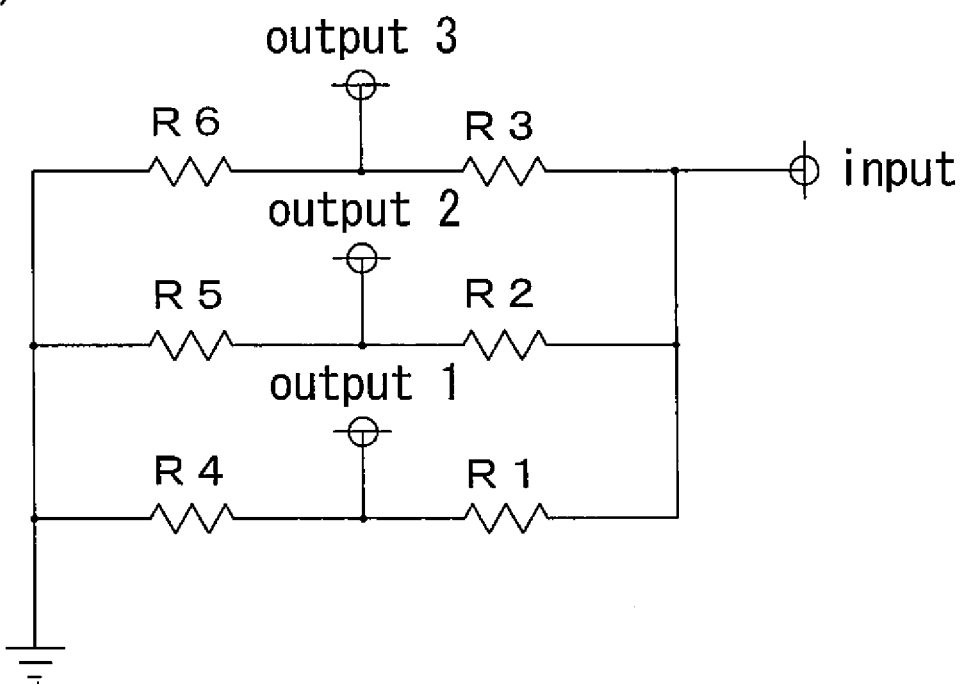

FIG. 5 is a graph illustrating a change in output voltage of the single sensor output from the single-sensor-output electric circuit 60. FIG. 6 is a graph illustrating changes in output voltages of the three sensor outputs from the three-sensor-output electric circuit 60.

As illustrated in FIG. 5, the single output voltage decreases as the amount of foreign matter attracted to the magnets increases with time. If the output voltage falls below the threshold, the control means 70 judges that the rolling bearings are now in an abnormal state, and sends a warning.

Output voltage "Vout" in the voltage dividing circuit satisfies the formula "Vout=[(R2 to R4)/{R1+(R2 to R4)}]× VDD", where VDD is the input voltage, which is the difference between the electric potential of the input terminal (power source) 62 and the electric potential of the GDN terminal 64.

In FIG. 6, the output voltages corresponding to the three sensor outputs decrease in the respective voltage dividing circuits as the amount of foreign matter attracted to the magnets increases with time. If the output voltage in any one of the voltage dividing circuits falls below the threshold, the control means 70 judges that the rolling bearings are now in an abnormal state, and sends a warning.

Output voltages "Vout" in the respective voltage dividing circuits satisfy the following formulas:

"Vout1={(R4)/(R1+R4)}×VDD"

"Vout2={(R5)/(R2+R5)}×VDD"

"Vout3={(R6)/(R3+R6)}×VDD"

where VDD is the input voltage, which is the difference between the electric potential of the input terminal (power source) 62 and the electric potential of the GDN terminal 64.

Since the gap between the radially outer permanent magnets 51a and 51b is larger than the gap between the radially intermediate permanent magnets 52a and 52b, and the gap between the magnets 52a and 52b is larger than the gap between the radially inner permanent magnets 53a and 53b, or, in the case where the magnetic members 51c, 51b and 51c are arranged on the substrate 50, the gaps between the magnetic member 51c and the radially outer permanent magnets 51a and 51b are larger than the gaps between the magnetic member 52c and the radially intermediate permanent magnets 52a and 52b, and the gaps between the member 52c and the magnets 52a and 52b are larger than the gaps between the magnetic member 53c and the radially inner permanent magnets 53a and 53b, the following relationships 1 to 3 are established:

1. gap size: (radially inner) gap 1<(radially intermediate) gap 2<(radially outer) gap 3

2. magnitude of resistance: (radially inner) resistance R4<(radially intermediate) resistance R5<(radially outer) resistance R6

3. short-circuit speed: (radially inner) output 1>(radiallyintermediate) output 2>(radially outer) output 3

Thus, the timings of changes of outputs 1 to 3 differ from each other.

This difference of timing enables the control means 70 to estimate the maximum diameter of the foreign objects contained in lubricating oil, and estimate the amount of foreign matter that has entered lubricating oil. For example, the control means 70 can judge, if output 1 falls below the threshold, that the diameters of the foreign objects contained in lubricating oil are in range 1; if output 2 falls below the threshold, that the diameters of the foreign objects contained in lubricating oil are in range 2 which is higher than range 1; and if output 3 falls below the threshold, the diameters of the foreign objects contained in lubricating oil are in range 3 which is higher than range 2.

By storing such judgement data/information, the data storage means 72 and the chronological change confirming means 73 are capable of utilizing the memorized data/information in the next judgement or warning transmission.

While, in the embodiment, two filters F are provided on the respective seal rings 40, which close the openings of the bearing spaces of the respective rolling bearings 21 and 23, instead of such filters F, a filter or filters F may be provided at a portion or portions of the oil pump device 10 other than the seal rings 40. For example, filters F capable of catching foreign matter may be provided in the circulation paths 12 and 13, and such an abnormality detector as described above may be mounted to each of such filters F.

The abnormality detector for a rolling bearing according to the present invention may be applied to a device other than an oil pump device, particularly to various kinds of devices which need to prevent foreign matter, such as iron dust and other wear dust, occurring in rolling bearings from entering an operation mechanism located midway of the lubricating oil circulation path.

An oil pump device 10 according to the second embodiment of the present invention is now described with reference to FIGS. 8 to 11. This oil pump device 10 includes a bearing unit 20 to which a seal ring 40 is mounted.

The bearing unit 20 includes a plurality of (three, to be exact) rolling bearings. The oil pump device 10 further includes an operation mechanism 30.

The three rolling bearings 21, 22 and 23 are arranged in juxtaposition with each other in a fixed housing 11, and lubricated by oil. A shaft member 32 is connected to the operation mechanism 30 and supported by the rolling bearings 21, 22 and 23 so as to be rotatable about the center axis of the shaft member 32 relative to the fixed housing 11.

Each of the rolling bearings 21, 22 and 23 includes an outer race 1 having a raceway 1a; an inner race 2 having a raceway 2a; rolling elements 3 arranged between the raceway 1a of the outer race 1 and the raceway 2a of the inner race 2; and a retainer 4 retaining the rolling elements 3 in the circumferential direction.

The outer races 1 of the rolling bearing 21, 22 and 23 are press-fitted and fixed to the inner diameter surface of the housing 11 so as to be non-rotatable relative to the housing 11. The inner races 2 of the rolling bearing 21, 22 and 23 are press-fitted and fixed to the outer periphery of the shaft member 32 so as to be non-rotatable relative to the shaft member 32.

While, as the rolling bearings 21, 22 and 23, tapered roller bearings are used which include tapered rollers as the rolling elements 3 in the embodiment, rolling bearings other than tapered roller bearings may be used. Also, while three rolling bearings are used in the embodiment, the number of rolling bearings arranged in the housing 11 is not limited to three, and may be freely altered in accordance with the specifications of the device.

The oil pump device 10 of the second embodiment is a plunger pump including a pump casing F, and a pump cylinder block (not shown) configured to rotate in the pump casing F. The cylinder block is connected, through pistons arranged in respective cylinder chambers defined in the cylinder block, and connecting rods connected to the respective pistons, to a connection member 31 provided on the shaft member 32 at its end, thereby constituting the operation mechanism 30, in which components slide relative to each other.

One end of each connecting rod is pivotally connected to the corresponding piston through e.g., a spherical seat, whereas the other end of each connecting rod is pivotally connected to the connection member 31 through e.g., a spherical seat, so that the rotation of the cylinder block about its center axis can be transmitted to the shaft member 32, and the rotation of the shaft member 32 about its center axis can be transmitted to the cylinder block. The connecting rods are arranged such that the connection points between the other ends of the respective connecting rods and the connection member 31 are on different planes perpendicular to the center axes of the connecting rods. That is, this oil pump device is a so-called swash plate type piston pump.

When a driving force is input to the shaft member 32 and the pump cylinder block from a driving source (not shown), and thus the shaft member 32 and the cylinder block rotate, the connecting rods move forward and backward in the axial directions of the connecting rods such that the pistons reciprocate in the pump cylinder block. The oil pump device thus sends lubricating oil to circulation paths.

As illustrated in FIG. 8, of the three rolling bearings 21, 22 and 33, the rolling bearings 21 and 22, which are located near one axial end of the device 10 on which the operation mechanism 30 is located, are arranged such that the small-diameter end surfaces of the tapered rollers of the rolling bearings 21 and 22 are directed toward the other axial end of the device 10 opposite from the one axial end thereof, i.e., opposite from the operation mechanism 30.

The other rolling bearing 23, which is located closest to the other axial end of the device 10 (i.e., remotest from the operation mechanism 30) is arranged such that the small-diameter end surfaces of the tapered rollers of the rolling bearing 23 are directed toward the operation mechanism 30. Namely, the bearings 21 and 22 are arranged in a back-to-back relationship with the bearing 23, which means that the small-diameter end surfaces of the tapered rollers of the bearings 21 and 22 face the small-diameter end surfaces of the tapered rollers of the bearing 23. Therefore, the rolling bearings 21 and 22 near the one axial end are each arranged such that the distance between the raceway 1*a* of the outer race 1 and the raceway 2*a* of the inner race 2 decreases toward the other axial end, whereas the rolling bearing 23 near the other axial end is arranged such that the distance between the raceway 1*a* of the outer race 1 and the raceway 2*a* of the inner race 2 increases toward the other axial side.

As illustrated in FIG. 8, spacers 5 and 6 are arranged between the axially adjacent rolling bearings 21 and 22, and a spacer 7 is arranged between the axially adjacent rolling bearings 22 and 23.

Specifically, the spacer 5 is arranged between the inner diameter portions of the rolling bearings 21 and 22 so as to abut against the end surfaces of the inner races 2 of the rolling bearings 21 and 22. The spacer 6 is arranged between the outer diameter portions of the rolling bearings 21 and 22 so as to abut against the end surfaces of the outer races 1 of the rolling bearings 21 and 22.

The spacer 7 is arranged between the outer diameter portions of the rolling bearings 22 and 23 so as to abut against the end surfaces of the outer races 1 of the rolling bearings 22 and 23. Though not illustrated in FIG. 1(*b*), an additional spacer is arranged between the inner diameter portions of the rolling bearings 22 and 23 so as to abut against the end surfaces of the inner races 2 of the rolling bearings 22 and 23. This additional spacer extends along the circumferential direction of the rolling bearings 22 and 23 so as not to close openings of radial circulation path portions 13*b* for lubricating oil that are located at the outer diameter surface of the shaft member 32.

The end of the rolling bearing 21 directed toward the one axial end of the device 10 is fixed in position by the end surface of the flange-shaped connection member 31, which is on the end of the shaft member 32, and the end of the rolling bearing 23 directed toward the other axial end of the device 10 is fixed in position by the end surface of a presser 8 so that the rolling bearings 21, 22 and 23 are axially unmovable relative to the shaft member 32. By fixing these ends by the connection member 31 and the presser 8, a preload is applied to the rolling bearings (tapered roller bearings).

The shaft member 32, supported by the housing 11 through the rolling bearings 21, 22 and 23, is connected to the operation mechanism 30 of the oil pump device. The oil pump device is capable of sending lubricating oil contained in the oil pump device to an external operation mechanism G. The lubricating oil sent out of the oil pump device flows through an oil path, lubricates the operation mechanism G, and returns to the oil pump device.

The oil pump device is configured such that the bearing unit 20 and the operation mechanism 30 are lubricated by common lubricating oil. The operation mechanism 30 and the bearing space of the bearing unit 20 communicate with each other through the side opening D of the bearing space of the rolling bearing 21 at the one axial end thereof close to the one axial end of the device 10, and circulation paths 12 and 13 through which lubricating oil circulates. The lubricating oil is also sent to the outside operation mechanism G.

In the embodiment, the circulation path 13 comprises an axial circulation path portion 13*a* axially extending from the operation mechanism 30 such that the center axis of the path portion 13*a* is located on the center axis of the shaft member 32, and the above-mentioned radial circulation path portions 13*b*, extending radially outwardly from the end of the axial circulation path portion 13*a*, and opening to the outer peripheral surface of the shaft member 32. The radial circulation path portions 13*b* open to or communicate with the annular space C defined between the rolling bearings 22 and 23. Therefore, the circulation path 13 communicates, through the annular space C, with the bearing spaces of the rolling bearings near the one axial end of the device 10 (left side of FIG. 8(*b*)), i.e., the rolling bearings 21 and 22, and with the bearing space of the rolling bearing near the other axial end of the device 10 (right side of FIG. 8(*b*)), i.e., the rolling bearing 23.

The lubricating oil that has passed through the annular space C, and then through the bearing space of the rolling bearing 23 flows, through the opening of the bearing space of the rolling bearing 23 at the other axial end thereof, into a housing end space B defined between the other axial end of the rolling bearing 23 and the housing 11. Thereafter, the lubricating oil flows through circulation paths 12 formed in the housing 11, and returns to the operation mechanism 30.

Each circulation path 12 comprises a radial circulation path portion 12*b* extending radially outwardly from the housing end space B, and an axial circulation path portions 12*a* axially extending, in the direction of the center axis of the shaft member 32 through the radially outer portion of the housing 11, from the radial circulation path portion 12*b*.

The lubricating oil that has passed through the annular space C the bearing space of the rolling bearing 22, and the bearing space of the rolling bearing 21 returns, through the side opening D of the bearing space of the rolling bearing 21 at the one axial end thereof, to the operation mechanism 30.

In this way, the operation mechanism 30, and the rolling bearings 21, 22 and 23 of the bearing unit 20 are lubricated by common lubricating oil.

Foreign matter such as iron dust or other wear dust may occur in the bearing spaces of the rolling bearings 21, 22 and 23. It is not preferable that such foreign matter enters the operation mechanism 30 and/or the operation mechanism G, located in the midway portion of the circulation path. In order to prevent foreign matter from entering these mechanisms, a seal member 40 (hereinafter referred to as "the seal ring 40" because the seal member 40 is an annular one in the embodiment) is attached to the side opening D of the bearing space of the rolling bearing 21 at the one axial end thereof, and the openings 12*c* of the axial circulation path portions 12*a* at their axial ends.

Specifically, the seal ring 40 is attached to the housing 11 and the outer race 1 of the rolling bearing 21 so as to cover the side opening D and the openings 12*c*. The side opening D is an annular opening along the raceways 1*a* and 2*a* of the outer and inner races 1 and 2 of the rolling bearing 21. Therefore, the seal ring 40, covering the annular side opening D, has an annular shape.

Figure 9:
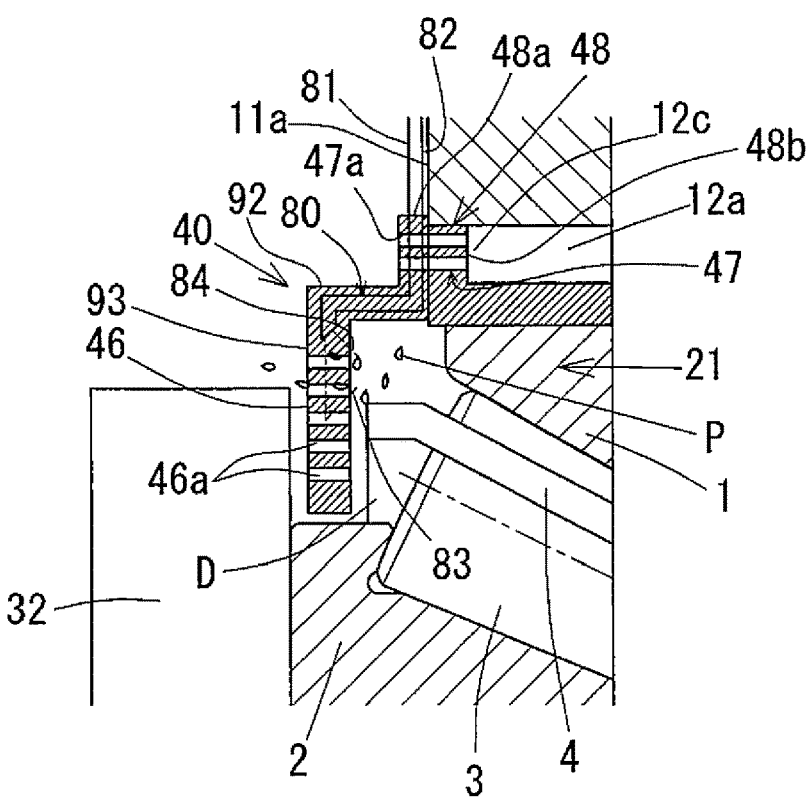
FIGS. 9(a) and 9(b) are enlarged view each illustrating a portion of the oil pump device illustrated in FIG. 1(a).
Figure 9:
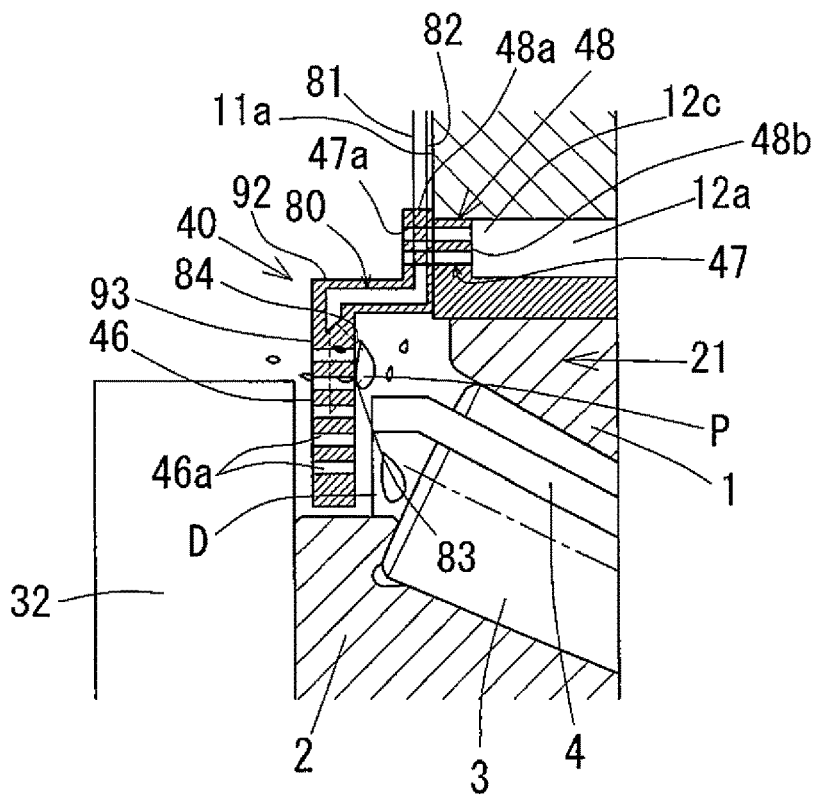
Figure 10:
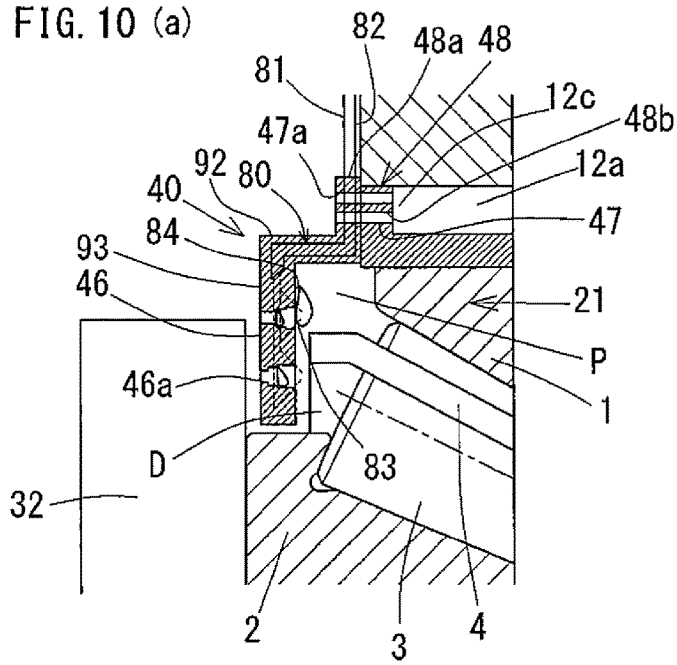
FIGS. 10(a) and 10(b) are enlarged sectional views each illustrating, as a variation, a portion of the oil pump device illustrated in FIG. 1(a).
FIGS. 10(c) and 10(d) are enlarged sectional views each illustrating, as a different variation, a portion of the oil pump device illustrated in FIG. 1(a).
FIG. 10(e) is an enlarged sectional view illustrating, as a still different variation, a portion of the oil pump device illustrated in FIG. 1(a).
Figure 10:
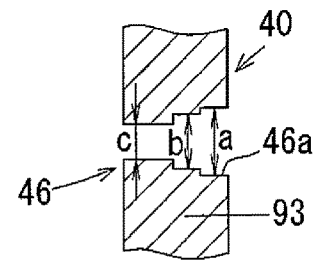
Figure 10:
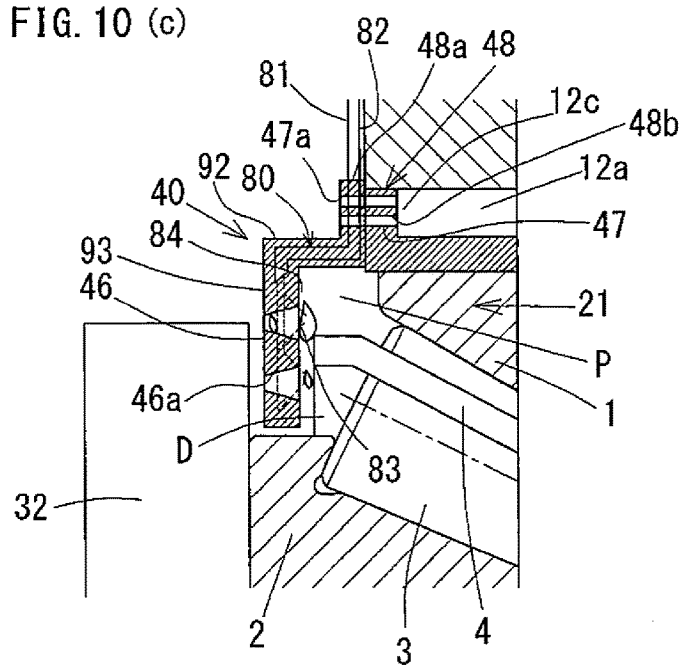
Figure 10:
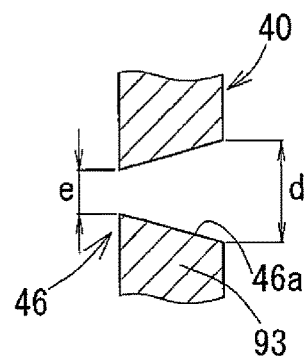
Figure 10:
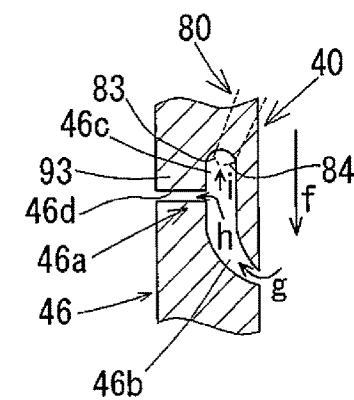

As illustrated in FIGS. 9(*a*) and 9(*b*), the seal ring 40 includes a cylindrical portion 92 comprising a cylindrical member having an axial end surface 91 abutting against the end surface 11*a* of the housing 11; and a wall portion 93 extending radially inwardly from one axial end of the cylindrical portion 92.

The wall portion 93 includes a filter 46 comprising filter holes 46*a* in the form of through holes, and preventing foreign matter in the bearing spaces of the rolling bearings 21 and 22 from passing through the filter 46, while allowing lubricating oil to pass through the filter 46. The diameters of the filter holes 46*a* are determined such that foreign matter which will not adversely affect the operation mechanism 30 even if it enters the operation mechanism 30 is allowed to pass through the filter holes 46*a*.

The seal ring 40 includes four engagement portions 49 circumferentially spaced apart from each other, and axially extending from the other axial end of the cylindrical portion 92 toward the other axial end of the pump device 10. While, in the embodiment, the number of the engagement portions 49 is four so as to coincide with the number of the axial circulation path portions 12a (axial circulation paths 12), the number of the engagement portions 49 may be freely increased or decreased.

The engagement portions 49 extend through the space between the inner diameter surface of the housing 11 and the outer diameter surface of the outer race 1 of the rolling bearing 21, and are engaged with bearing components such as a bearing race and/or a spacer, thereby fixing the seal ring 40 to the housing 11 and the outer race 1 of the rolling bearing 21.

In the embodiment, each engagement portion 49 includes an axial member 49b extending through the corresponding circulation path 12 toward the other axial end of the pump device 10 and press-fitted to the outer diameter surface of the outer race 1 of the rolling bearing 21, and a radial member 49a extending radially inwardly from the other axial end of the axial member 49b.

The axial members 49b are portions of a cylindrical member, and in surface contact with the outer diameter surface of the outer race 1 of the rolling bearing 21. The radial members 49a are engaged in a recess .or recesses provided in a bearing race and/or a spacer to prevent axial movement of the seal ring 40. In the embodiment, the radial members 49a are engaged in a recess defined by the end surface 1b of the outer race 1 of the rolling bearing 21 at the other axial end thereof, and a step provided on the end surface 6a of the spacer 6 at the one axial end thereof.

The radially inner periphery of the wall portion 93 is in sliding contact with, or opposed through a minute gap to, the outer diameter surface of the large-diameter flange of the inner race 2 of the rolling bearing 21, thereby forming a labyrinth seal structure between the wall portion 93 and the inner race 2 of the rolling bearing 21. This labyrinth seal structure prevents foreign matter contained in lubricating oil from passing through the labyrinth seal structure, while allowing lubricating oil to pass through the labyrinth seal structure.

The openings 12c of the axial circulation path portions 12a at their axial ends are located radially outwardly of the side opening D of the bearing space of the rolling bearing 21, which is an annular-shaped opening when seen from the lateral side thereof, namely, are located outside of the rolling bearing 21. While the embodiment uses four axial circulation path portions 12a defining four openings 12c circumferentially spaced apart from each other at intervals of 90 degrees, the number of the openings 12c may be increased or decreased as necessary.

Figure 11:
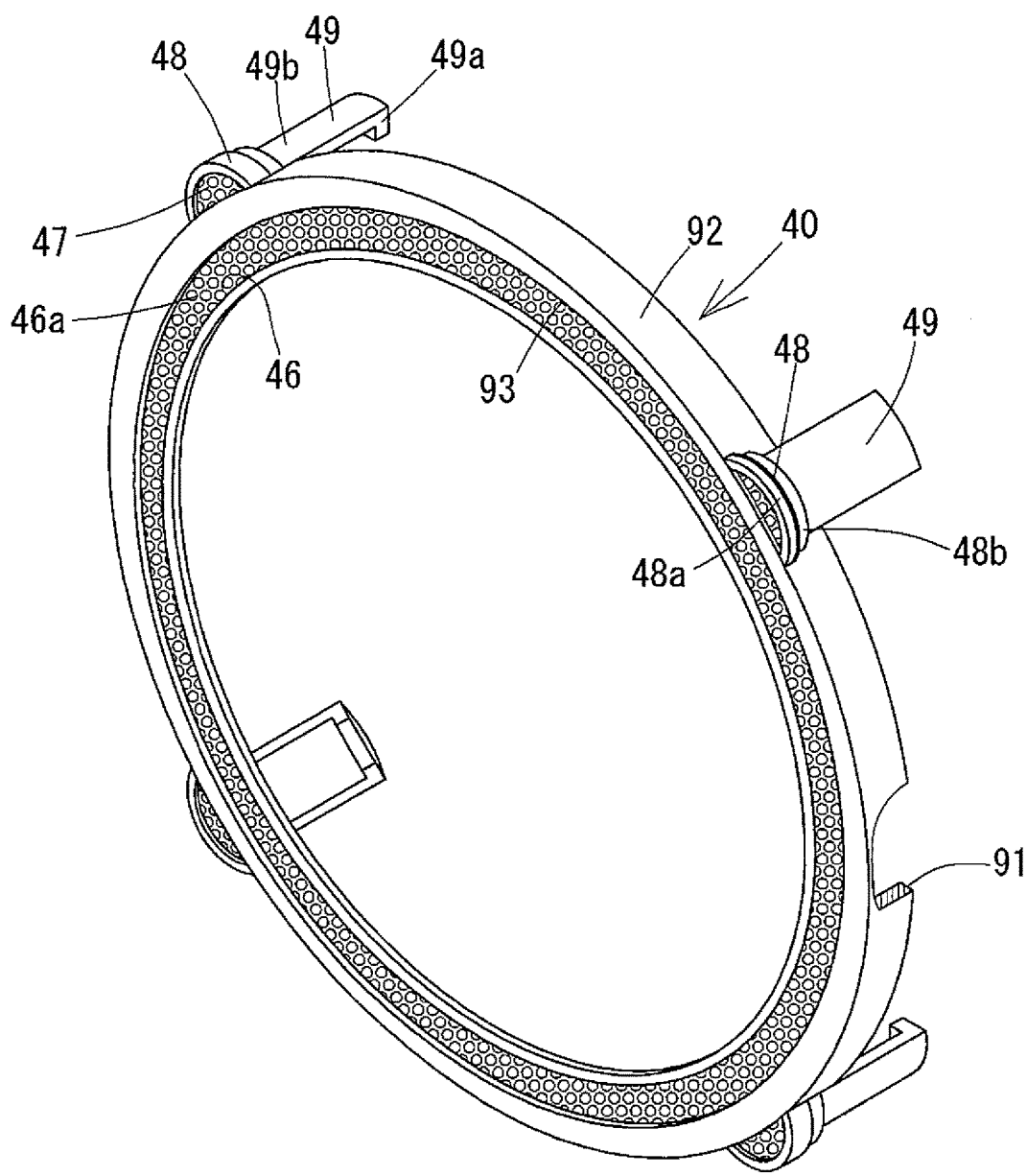
FIG. 11 is a perspective view of a seal member.

The seal ring 40 further includes circulation path closing portions 48 provided only in circumferential ranges corresponding to the openings 12c of the circulation paths 12 to cover the respective openings 12c, and each including a filter 47 configured to prevent foreign matter from passing through the filter 47 (see FIG. 11).

The circulation path closing portions 48 are equal in number to the openings 12a of the circulation path 12. In the embodiment, since four axial circulation path portions 12aare provided to define four openings circumferentially spaced apart from each other at intervals of 90 degrees, four circulation path closing portions 48 are used so as to be circumferentially spaced apart from each other at intervals of 90 degrees.

The engagement portions 49 are equal in width in the circumferential direction of the rolling bearings (such width is hereinafter simply referred to as the "circumferential width") to the axial circulation path portions 12a of the circulation paths 12 so as to be firmly (unmovably) fixed in position in the respective axial circulation path portions 12a. In other words, the engagement portions 49 are provided in the same circumferential ranges as the circulation path closing portions 48. While the engagement portions 49, the circulation path closing portions 48, the cylindrical portion 92, and the wall portion 93 are constituted by an integral member, the engagement portions 49 and the circulation path closing portions 48 may be provided separately from and fixed to the cylindrical portion 92, and the wall portion 93.

Each circulation path closing portion 48 includes, along the axial direction, a radially outwardly extending first protrusion 48a, and a second protrusion 48b extending radially outwardly to a lower height than the first protrusion 48a . The first and second protrusions 48a and 48b each have a cylindrical outer surface.

The radially outwardly extending second protrusion 48b is inserted in the corresponding axial circulation path portion 12a with the cylindrical outer surface of the second protrusion 48b in contact with the cylindrical inner surface of the axial circulation path portion 12a. The second protrusion 48b is equal in circumferential width to the engagement portion 49, which is equal in circumferential width to the axial circulation path portion 12a. Therefore, the second protrusions 48b of the circulation path closing portions 48 and the axial circulation path portions 12a constitute an anti-rotation means for rotationally fixing the seal ring 40 relative to the housing 11 and the outer races 1. In the embodiment, the axially extending engagement portions 49 of the seal ring 40, and the axial circulation path portions 12a also constitute such an anti-rotation means for rotationally fixing the seal ring 40.

Since the first protrusions 48a extend radially outwardly to a higher height than the corresponding second protrusions 48b, the first protrusions 48a are not inserted in the axial circulation path portions 12a, but the end surfaces of the first protrusions 48a closer to the second protrusions 48b are in abutment with the portions of the end surface 11a of the housing 11 around the openings 12c of the circulation paths 12, so that the seal ring 40 is axially positioned.

The filters 47 of the circulation path closing portions 48 comprise filter holes 47a in the form of through holes, and are configured to prevent foreign matter in the bearing space of the rolling bearing 23 from passing through the filters 47, while allowing lubricating oil to pass through the filters 47. The diameters of the filter holes 47a are appropriately set such that foreign matter which will not adversely affect the operation mechanism 30 even if it enters the operation mechanism 30 is allowed to pass through the filter holes 47a . Specifically, the diameters of the filter holes 47a may be set to be equal to the diameters of the filter holes 46a.

Thus, in this arrangement, the lubricating oil from the bearing spaces of the rolling bearings 21, 22 and 23 flows out of the bearings through the radially inner filter 46 and the radially outer filters 47 of the seal ring 40, but such large foreign objects as could adversely affect the operation of the operation mechanism 30 are prevented from entering the operation mechanism 30 by the seal ring 40.

In the embodiment, the seal ring 40 is made of a synthetic resin, and the filters 46 and 47 comprise filter holes (through holes) 46a and 47a formed directly in the synthetic resin seal ring 40. However, the seal ring 40 may be made of a material other than a synthetic resin, such as metal or rubber. Also, the filter 46 of the wall portion 93 and the filters 47 of the circulation path closing portions 48 may comprise, instead of filter holes directly formed in the seal ring 40, separate filter members (such as punched metal sheets) fixed to the body of the seal member 40 by fitting, embedding, bonding, etc.

As described above, the filter 46 comprises filter holes 46 axially extending through the wall portion 93 of the seal ring 40. In FIGS. 9(*a*) and 9(*b*), the filter holes 46*a* are straight through holes each having a uniform inner diameter over the entire axial length thereof.

As illustrated in FIGS. 9(*a*) and 9(*b*) in detail, a sensor device 80 configured to detect foreign matter is attached to the seal ring 40.

The sensor device 80 is located closer to the bearing space of the rolling bearing 21, than is the filter 46 of the wall portion, and includes an electric circuit provided with pairs of electrodes 83 and 84, each pair being spaced apart from each other, and lines 81 and 82 extending from the respective electrodes 83 and 84 to a power source. An output detector (not shown) is connected to the lines 81 and 82, and, and configured to detect a change in electrical output from the electric circuit when a foreign object comprising a metal object adheres between any pair of the electrodes 83 and 84, thereby detecting the state of metal pieces contained in lubricating oil. The electric circuit and the output detector may have a well-known structure enabling the output detector to detect a change in electrical output from the electric circuit. For example, they may have the structure shown in the first embodiment.

The output detector is capable of detecting a change in electrical output from the electric circuit when a foreign object (metal object) which cannot pass through the filter 46 adheres between any pair of the electrodes 83 and 84, thereby detecting that at least one foreign object (metal piece) which cannot pass through the filter 46 is contained in lubricating oil.

The distal ends of the electrodes 83 and 84 are exposed to the inner surface of the seal ring 40 (surface closer to the bearing space of the rolling bearing 21). In the embodiment, the distal ends of the electrodes 83 and 84 protrude beyond the inner surface of the seal member 40, so that a foreign object can easily adhere to the distal ends of any pair of the electrodes 83 and 84 to cover the gap between the distal ends of the electrodes 83 and 84. FIG. 9(*a*) illustrates a normal state. FIG. 9(*b*) illustrates the state in which a foreign object has adhered to the distal ends of a pair of the electrodes 83 and 84 to cover the gap between the distal ends of the electrodes 83 and 84, and thus the electrodes 83 and 84 are electrically connected to each other through the foreign object. In FIGS. 9(*a*) and 9(*b*), each pair of the electrodes 83 and 84 are arranged such that the distance between the electrodes 83 and 84 gradually decreases from the proximal ends of the electrodes 83 and 84 toward the protruding distal ends thereof (i.e., they form the shape of the Japanese character "八").

Preferably, the electrodes 83 and 84 are mounted to the entrances of selected ones of the filter holes 46*a* (to their openings facing the bearing space of the rolling bearing 21), because a foreign object can easily come into contact with the electrodes 83 and 84 arranged in this way. The number of pairs of the electrodes 83 and 84 is not limited, and any unlimited number of pairs of them may be arranged at predetermined equal intervals in the circumferential direction of the seal ring 40; arranged in a random manner at irregular intervals; or arranged in the radial direction of the seal ring 40. If possible, a pair of electrodes 83 and 84 may be arranged in every one of the filter holes 46*a*.

Sensor devices 80 having the same structure as the sensor device 80 of the filter 46 (and thus not described) may be additionally mounted to at least one of the filters 47 of the circulation path closing portions 48.

The lines 81 and 82 of the sensor device 80 extend from the respective electrodes 83 and 84, pass through the wall portion 93 and the cylindrical portion 92 of the seal ring 40, pass by the end surface 11*a* of the housing 11, which is fixed to the pump casing F, and extend to the exterior of the bearing unit. In the embodiment, the lines 81 and 82 extend through one of the circulation path closing portions 48, which are located at the radially outermost portion of the body of the seal ring 40. While the lines 81 and 82 may be drawn to the exterior of the bearing unit from any portion of the seal ring 40, to better protect the lines 81 and 82, the lines are preferably drawn to the outside of the bearing unit from a portion of the seal ring as close to its radially outermost portion as possible. Thus, in the embodiment, they are preferably the lines 81 and 82 are drawn to the exterior of the bearing unit from the apex (i.e., the radially outermost portion) of one of the circulation path closing portions 48.

In the embodiment, the midway portions of the lines 81 and 82 are embedded in and fixed to the seal ring 40. Specifically, the portions of the lines 81 and 82 extending from the roots (proximal end portions) of the lines that are close to the electrodes 83 and 84 to the apex of the circulation path closing portion 48 are embedded in the seal ring 40, and thus are not exposed to the exterior of the seal ring 40. However, the lines 81 and 82 may be arranged along the outer surface of the seal ring 40, if even such an arrangement does not damage the lines 81 and 82 and adversely affect the strength of the lines 81 and 82.

Since the seal ring 40 is rotationally fixed relative to the housing 11, it is possible to prevent the lines 81 and 82 from being disconnected or cut.

In the embodiment, the seal ring 40 is rotationally fixed relative to the housing 11 by the protrusions of the seal ring 40, which are the circulation path closing portions 48 and the engagement portions 49, being fitted tightly (in the width direction of the circulation paths 12) in the respective circulation paths 12. Also, in the embodiment, since the lines 81 and 81 are drawn to the exterior of the bearing unit from the point where the seal ring 40 is rotationally fixed in position, an external force is less likely to be applied to the lines 81 and 82.

The seal ring 40 may be rotationally fixed in position not by fitting the circulation path closing portions 48 and the engagement portions 49 in the circulation paths 12, but by another means. For example, the seal ring 40 may be rotationally fixed in position by forming protrusions on (or recesses in) the end surface of the cylindrical portion 92 of the seal ring 40; forming recesses in (or protrusions on) the end surface 11*a* of the housing 11; and engaging the protrusions in the respective recesses. Alternatively, the seal ring 40 may be rotationally fixed in position by forming protrusions on (or recesses in) the inner surface of the cylindrical portion 92 of the seal ring 40 or axial protrusions of the seal member 40 such as the engagement portions 49; forming recesses in (or protrusions on) the outer diameter surface of the outer race 1 of the rolling bearing 21 coming into contact therewith; and engaging the protrusions in the respective recesses. If the protrusions are formed on the seal ring 40, and the recesses are formed in the housing 11 or a member fixed to the seal ring 40, the recesses may be, as described above, the openings of the circulation paths 12, through which lubricating oil circulates.

Each filter hole 46a may be shaped so as to gradually narrow from its end facing the bearing space toward its other end, i.e., the end opposite from the bearing space.

For example, as illustrated in FIGS. 10(a) and 10(b), the filter hole 46a may be shaped so as to narrow, in a stepwise manner, from its end facing to the bearing space toward its other end. In particular, in FIGS. 10(a) and 10(b), the filter hole 46a is formed such that the diameters "a", "b" and "c" illustrated in FIG. 10(b) satisfy the formula "a>b>c". Therefore, the filter hole 46a can catch foreign objects having various sizes at the different positions corresponding to the sizes of the foreign objects.

For example, if the maximum diameter of a foreign object is not less than the diameter "a" of the filter hole 46a, the foreign object is not allowed to pass through the diameter portion "a" of the filter hole 46a, and thus is caught at or near the entrance of the filter hole 46a, i.e., upstream of the portion "a".

If the maximum diameter of a foreign object is less than the diameter "a" and not less than the diameter "b", the foreign object is allowed to pass through the inner diameter portion "a", but cannot pass through the diameter portion "b", and thus is caught at or near the diameter portion "a", i.e., the portion of the filter hole on the upstream side of the portion "b".

If the maximum diameter of a foreign object is less than the inner diameters "a" and "b" and not less than the inner diameter "c", the foreign object is allowed to pass through the diameter portions "a" and "b", but cannot pass through the diameter portion "c", and thus is caught at or near the portion "b", i.e., the portion of the filter hole on the upstream side of the portion "c".

Since, as described above, the filter hole 46a can catch foreign objects at the different positions corresponding to the sizes of the foreign objects, by arranging the pairs of electrodes 83 and 84 of the sensor device 80 at different positions, it is possible to electrically learn the sizes of foreign objects caught by the filter hole 46. For example, by mounting the respective pairs of electrodes 83 and 84, respectively, to the entrance of the diameter portion "a" (which faces the bearing space), the entrance of the diameter portion "b", and the entrance of the diameter portion "c", it is possible to determine the sizes of foreign objects caught in the filter hole relative to diameters "a", "b" and "c", from the fact that the electric circuits of the output detector corresponding to the respective pairs of electrodes 83 and 84 have been closed, or from the intensity of current flowing through the respective electric circuits and changes in electrical output such as voltage.

Also, for example, as illustrated in FIGS. 10(c) and 10(d), the filter hole 46a may be a tapered hole gradually narrowing from its end facing the bearing space toward its other end, i.e., its end opposite from the bearing space. In FIGS. 10(c) and 10(d), the filter hole 46a has a mortar-like shape, i.e., is tapered such that as illustrated by the diameters "d" and "e" ("d" >"e") of the filter hole 46a in FIG. 10(d), the filter hole 46a gradually narrows from the inner diameter "d" toward the inner diameter "e". Therefore, as in the example of FIGS. 10(a) and (10b), the tapered filter hole 46a can also catch foreign objects having various sizes at the different positions corresponding to the sizes of the foreign objects. In the example of FIGS. 10(c) and (d), too, pairs (plural) of electrodes 83 and 84 may be mounted to the filter hole 46a in the length direction of the, filter hole 46a.

Also, the filter hole 46a may include orifice portions between its end facing the bearing space and its other end opposite from the bearing space. For example, as illustrated in FIG. 10(e), the filter hole 46a may include an introducing hole portion 46b extending in the direction opposite to the direction "f" in which lubricating of moves when the seal ring 40 rotates (i.e., extending in the same direction as the direction in which the seal ring 40 rotates); a reservoir portion 46c provided at the deep end of the introducing hole portion 46b; and a discharging hole portion 46d branching off from the portion of the introducing hole portion 46b located ahead of (upstream of) the reservoir portion 46c, and extending to the other end of the filter hole 46a . The entrance of the introducing hole portion 46b is narrow, and the discharging hole portion 46d is narrower than the section of the introducing hole portion 46b at which the discharging hole portion 46d branches off. These two portions therefore constitute orifice portions of the filter hole 46a.

Due to the orifice effect of the narrow entrance of the introducing hole portion 46b, foreign matter contained in the lubricating oil flowing in the movement direction f is introduced, in the direction of the arrow "g" of FIG. 10(e), into the introducing hole portion 46b . Thereafter, since the foreign matter has a higher density than the lubricating oil, the foreign matter flows, due to inertia force, to the reservoir portion 46c at the deep end as shown by the arrow "i" of FIG. 10(e), whereas the lubricating oil flows, through the discharging hole portion 46d, out of the filter hole 46a as shown by the arrow "h" of FIG. 10(e). The foreign matter that has flowed into the reservoir portion 46c is detected by the electrodes 83 and 84 of the sensor device 80.

The filter holes 47a of the filters 47 of the circulation path closing portions 48 may have the same structure as the filter holes 46a of the filter 46 illustrated in each example of FIGS. 10(a) to 10(e). Namely, each filter hole 47a may be a hole narrowing in a stepwise or gradual manner, from the end facing the corresponding circulation path 12 toward its other end opposite from the circulation path 12, or a hole including orifice portions.

While, in the embodiment, the openings 12c of the axial circulation paths 12 at their axial ends communicate with the outside space of the rolling bearing 21 through the filters 47 of the circulation path closing portions 48, the openings 12c may be arranged to communicate with the space defined inside of the seal ring 40 such that the lubricating oil flowing through the openings 12c passes through the filter 46 of the wall portion 93. In this case, it is not necessary to provide the circulation path closing portions 48 with filters 47.

While, in the embodiment, the seal ring 40 is fixed to both the housing 11 and the outer race 1 of the rolling bearing 21, the seal ring 40 may be fixed to only one of the housing 11 and the outer race 1 of the rolling bearing 21, while not fixed to the other thereof.

While, in the embodiments, the outer races of the respective bearings are stationary, the inner races are rotatable, and the seal ring (or each seal ring) 40 is fixed to the stationary outer race of the corresponding bearing, the seal ring 40 may be fixed to the rotatable inner race by fitting or any other means, or fixed to another member fixed to the inner race.

If the seal ring 40 is fixed to the rotatable bearing race, and the sensor device 80 is mounted to the seal ring 40, the lines 81 and 82 preferably comprise line portions mounted to the rotatable bearing race, and line portions mounted to the fixed housing 11 and connected, through a contactor such as a brush, to the respective line portions mounted to the rotatable bearing race.

The seal ring (or each seal ring) 40 of the present invention may be applied to a rolling bearing of which the outer race is rotatable, and the inner race is stationary. In this case, the seal ring may be fixed to the stationary inner race, or the rotatable outer race or races 1.

While in the embodiments, the seal member (or each seal member) is an annular seal ring 40, a non-annular seal member may be used instead, provided that such a seal member defines therein a lubricating oil flow path which constitutes a centrifugal force applying path applying a centrifugal force to the lubricating oil flowing from the bearing space to the outside space of the bearing through the centrifugal force applying path; and a foreign matter catching portion catching the foreign matter separated from the lubricating oil to which a centrifugal force is applied by the centrifugal force applying path. For example, such a seal member may be a circumferentially C-shaped seal member when seen from the lateral side thereof.

While, in the second embodiment, the oil pump device 10 is a plunger pump (piston pump) configured to send lubricating oil to the circulation path when a driving force is input, and the seal member is used in the rolling bearing unit 20 of the plunger pump, the present invention is not limited to this embodiment, and may be applied to an oil pump device having a different structure, or applied to various devices other than an oil pump device, such as a device including a rolling bearing unit, and an operation mechanism lubricated by common lubricating oil lubricating the rolling bearing unit.

For example, the seal member of the present invention may be used in the rolling bearing unit of a hydraulic driving device, such as a plunger pump motor (piston pump motor) configured to reciprocate a plurality of pistons due to the fluid pressure of lubricating oil (hydraulic oil) supplied from outside, thereby rotating a shaft member about its center axis, and outputting the rotation driving force.

Also, the seal member or members of the present invention may be used in various devices which include a rolling bearing unit, in particular, which need to prevent foreign matter or objects such as wear dust (iron dust) or separated pieces occurring in the rolling bearings from going into an operation mechanism arranged in the midway portion of a lubrication path (in which lubricating oil circulates) located outside of the rolling bearings.

DESCRIPTION OF REFERENCE NUMERALS

1: outer race
2: inner race
3: rolling element
4: retainer
5, 6, 7: spacer
8: presser
10: oil pump device
11: housing
12, 13: circulation path
20: bearing unit
21, 22, 23: rolling bearing
30: operation mechanism
31: connection member
32: shaft member
40: seal ring
44, 46, 47: filter
48: circulation path closing portion
49: engagement portion
50: substrate
51a, 51b: permanent magnet
60: electric circuit
70: control means
71: output detector
72: data storage means
73: chronological change confirming means
80: sensor device
81, 82: line
83, 84: electrode

The invention claimed is:

1. A rolling bearing comprising:
an outer race;
an inner race;
rolling elements arranged in a bearing space between the outer race and the inner race, and
an abnormality detector comprising:
a filter configured to prevent metal pieces contained in lubricating oil flowing through the bearing space from passing through the filter, while allowing the lubricating oil to pass through the filter;
an electric circuit including a pair of electrodes, and lines extending from the respective electrodes to a power source; and
an output detector configured to detect a change in electrical output from the electric circuit when the metal pieces adhere between the pair of electrodes, thereby detecting a state of the metal pieces contained in the lubricating oil.

2. The rolling bearing according to claim 1, wherein the pair of electrodes of the electric circuit comprise a pair of permanent magnets provided on the filter so as to be spaced apart from each other.

3. The rolling bearing according to claim 2, wherein a magnetic member is arranged between the pair of permanent magnets such that gaps are defined between the magnetic member and the respective permanent magnets.

4. The rolling bearing according to claim 3, wherein the pair of electrodes, which comprise the pair of permanent magnets, is one of a plurality of pairs of electrodes of the abnormality detector, the plurality of pairs of electrodes comprising pairs of permanent magnets, and arranged such that gaps that are different in size from each other are defined between the respective pairs of electrodes.

5. The rolling bearing according to claim 2, wherein the filter comprises a through hole through which the lubricating oil flows, and
wherein the permanent magnets are arranged on respective sides of the through hole.

6. The rolling bearing according to claim 5, wherein the pair of electrodes, which comprise the pair of permanent magnets, is one of a plurality of pairs of electrodes of the abnormality detector, the plurality of pairs of electrodes comprising pairs of permanent magnets, and arranged such that gaps that are different in size from each other are defined between the respective pairs of electrodes.

7. The rolling bearing according to claim 2, wherein the electrical output comprises a voltage-divided output from the electric circuit.

8. The rolling bearing according to claim 7, wherein the pair of electrodes, which comprise the pair of permanent magnets, is one of a plurality of pairs of electrodes of the abnormality detector, the plurality of pairs of electrodes comprising pairs of permanent magnets, and arranged such that gaps that are different in size from each other are defined between the respective pairs of electrodes.

9. The rolling bearing according to claim 2, wherein the pair of electrodes, which comprise the pair of permanent magnets, is one of a plurality of pairs of electrodes of the abnormality detector, the plurality of pairs of electrodes comprising pairs of permanent magnets, and arranged such that gaps that are different in size from each other are defined between the respective pairs of electrodes.

10. The rolling bearing according to claim 2, wherein the electric circuit further includes terminals on a circuit substrate,
wherein the pair of permanent magnets include, on surfaces of the respective permanent magnets, coating layers made of an electrically conductive material, and
wherein the coating layers are electrically connected to the terminals of the electric circuit.

11. The rolling bearing according to claim 2, wherein the output detector is configured to judge, based on a predetermined threshold value and the electrical output from the electric circuit, that the rolling bearing is in an abnormal state.

12. The rolling bearing according to claim 11, further comprising:
a data storage arrangement configured to store information when the output detector judges that the rolling bearing is in an abnormal state; and
a chronological change confirming arrangement configured to confirm chronological changes in the abnormal state of the rolling bearing based on past judgement information stored in the data storage arrangement.

13. A bearing unit including the rolling bearing recited in claim 1, the bearing unit further comprising:
an operation mechanism located outside of the bearing space and including moving parts lubricated by lubricating oil;
a seal member mounted to one of the outer race, a member fixed to the outer race, the inner race, and a member fixed to the inner race (2), and covering a lubricating oil path extending from the bearing space to the operation mechanism;
wherein the seal member is provided with the filter so as to catch foreign matter contained in lubricating oil flowing from the bearing space to the operation mechanism through the filter,
wherein the pair of electrodes are mounted to the seal member, and
wherein the pair of electrodes, the electric circuit, and the output detector constitute a sensor device configured to electrically detect foreign matter comprising metal adhering between the pair of electrodes; and
an anti-rotation arrangement mounted between the seal member and the one of the outer race, the member fixed to the outer race, the inner race, and the member fixed to the inner race, and fixing the seal member such that the seal member is non-rotatable relative to the one of the outer race, the member fixed to the outer race, the inner race, and the member fixed to the inner race.

14. The bearing unit according to claim 13, wherein the seal member includes a wall portion covering a side opening of the bearing space of the rolling bearing, and provided with the filter extending along a circumferential direction of the wall portion of the seal member, and
wherein the sensor device is mounted to the filter.

15. The bearing unit according to claim 14, wherein the pair of electrodes of the sensor device are located on a side of the filter facing the bearing space so as to be spaced apart from each other, and
wherein the lines, extending from the respective electrodes to the power source, include portions provided at a circumferential position of the seal member where there is the anti-rotation arrangement, and extending to an outside space of the rolling bearing.

16. The bearing unit according to claim 13, further comprising a housing fixed in position radially outwardly of the outer race, and having a circulation path through which lubricating oil circulates, wherein the anti-rotation arrangement comprises a protrusion provided on the seal member, and inserted in the circulation path.

17. The bearing unit according to claim 16, wherein the circulation path opens to a portion of an end surface of the housing located radially outwardly of the side opening of the bearing space of the rolling bearing, and
wherein the protrusion of the seal member comprises a circulation path closing portion including an additional filter, and axially protruding into the circulation path while passing through the opening of the circulation path.

18. The bearing unit according to claim 16, wherein the pair of electrodes of the sensor device are located on a side of the filter facing the bearing space so as to be spaced apart from each other, and
wherein the lines, extending from the respective electrodes to the power source, include portions provided at a circumferential position of the seal member where there is the anti-rotation arrangement, and extending to an outside space of the rolling bearing.

19. The bearing unit according to claim 13, wherein the pair of electrodes of the sensor device are located on a side of the filter facing the bearing space so as to be spaced apart from each other, and
wherein the lines, extending from the respective electrodes to the power source, include portions provided at a circumferential position of the seal member where there is the anti-rotation arrangement, and extending to an outside space of the rolling bearing.

20. The bearing unit according to claim 13, wherein the pair of electrodes of the sensor device are located on a side of the filter facing the bearing space so as to be spaced apart from each other, and
wherein the lines, extending from the respective electrodes to the power source, include portions drawn from the circulation path closing portion to an outside space of the rolling bearing.

* * * * *